United States Patent
Shin et al.

(10) Patent No.: US 9,531,449 B2
(45) Date of Patent: Dec. 27, 2016

(54) METHOD OF CONTROLLING INTERFERENCE IN MULTI-HOP NETWORK BASED ON MIMO SYSTEM AND RELAY NODE AND NODE PAIR USING THE METHOD

(71) Applicant: SAMSUNG ELECTRONICS CO., LTD., Suwon-si (KR)

(72) Inventors: Won-Jae Shin, Seoul (KR); Won Jong Noh, Seoul (KR); Jong Bu Lim, Yongin-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 14/293,348

(22) Filed: Jun. 2, 2014

(65) Prior Publication Data

US 2014/0355514 A1    Dec. 4, 2014

Related U.S. Application Data

(60) Provisional application No. 61/830,699, filed on Jun. 4, 2013.

(30) Foreign Application Priority Data

Oct. 21, 2013   (KR) .................. 10-2013-0125410

(51) Int. Cl.
   *H04B 7/02*   (2006.01)
   *H04B 7/155*   (2006.01)
(52) U.S. Cl.
   CPC .......... *H04B 7/026* (2013.01); *H04B 7/15592* (2013.01)

(58) Field of Classification Search
   CPC ......... H04B 1/0475; H04B 1/10; H04B 1/715; H04B 7/02; H04B 7/15564; H04B 7/15585; H04J 11/0023; H04J 11/0063; H04J 11/005; H04L 5/0073; H04L 25/0328; H04L 25/08; H04L 25/085; H04L 27/2691
   See application file for complete search history.

(56) References Cited

U.S. PATENT DOCUMENTS

2002/0039383 A1 *   4/2002   Zhu .................... H03H 21/0012
                                                                 375/214
2005/0190822 A1     9/2005   Fujii et al.
(Continued)

FOREIGN PATENT DOCUMENTS

JP        2005-176376 A      6/2005
KR   10-2010-0043871 A      4/2010
(Continued)

OTHER PUBLICATIONS

Oyman, O. et al., "Design and analysis of linear distributed MIMO relaying algorithms," IEE Proceedings—Communications 153.4, Aug. 2006 (pp. 565-572).

(Continued)

*Primary Examiner* — Benjamin H Elliott, IV
(74) *Attorney, Agent, or Firm* — NSIP Law

(57) ABSTRACT

A method of controlling interference of relay nodes and node pairs in a multi-hop network, includes relaying signals received from source nodes among the node pairs to destination nodes pairing with the source nodes, and cancelling a part of interference signals between the node pairs by controlling channel coefficients of the relay nodes. The destination nodes are configured to cancel residual interference signals among the interference signals, using the signals received by the destination nodes.

17 Claims, 20 Drawing Sheets

(56) References Cited

U.S. PATENT DOCUMENTS

| | | | |
|---|---|---|---|
| 2009/0034437 A1* | 2/2009 | Shin | H04B 7/15585 370/278 |
| 2010/0067362 A1 | 3/2010 | Sakaguchi et al. | |
| 2010/0165846 A1* | 7/2010 | Yamaguchi | H04B 7/15592 370/236 |
| 2011/0149835 A1* | 6/2011 | Shimada | H04B 7/024 370/315 |
| 2011/0244790 A1* | 10/2011 | Kwak | H04B 7/15564 455/24 |
| 2012/0076243 A1* | 3/2012 | Gresset | H04J 11/0026 375/320 |
| 2012/0127914 A1* | 5/2012 | Tan | H04B 7/15592 370/315 |
| 2012/0219051 A1* | 8/2012 | Yin | H04B 1/71072 375/229 |
| 2013/0089023 A1* | 4/2013 | Shin | H04B 7/155 370/315 |
| 2014/0016515 A1* | 1/2014 | Jana | H04L 5/143 370/278 |
| 2014/0355514 A1* | 12/2014 | Shin | H04B 7/026 370/315 |

FOREIGN PATENT DOCUMENTS

| | | |
|---|---|---|
| KR | 10-2010-0049290 A | 5/2010 |
| KR | 10-2012-0047337 A | 5/2012 |
| KR | 10-2012-0129575 A | 11/2012 |
| WO | WO 2005/064872 A1 | 7/2005 |

OTHER PUBLICATIONS

Extended European Search Report issued on Apr. 9, 2015 in counterpart European Application No. 14170907.1 (14 pages).
Partial European Search Report issued Nov. 5, 2014 in counterpart European Patent Application No. 14170907.1 (6 pages, in English).
Thejaswi, P. S. C., Bennatan, A., Zhang, J., Calderbank, R., & Cochran, D. (Sep. 2008)."Rate-Achievability Strategies for Two-Hop Interference Flows". In Communication, Control, and Computing, 2008 46th Annual Allerton Conference on (pp. 1432-1439). IEEE.

* cited by examiner

METHOD OF CONTROLLING INTERFERENCE IN MULTI-HOP NETWORK BASED ON MIMO SYSTEM AND RELAY NODE AND NODE PAIR USING THE METHOD

CROSS-REFERENCE TO RELATED APPLICATIONS

This application claims the benefit under 35 USC 119(e) of U.S. Provisional Application No. 61/830,699, filed on Jun. 4, 2013, and the benefit under 35 USC 119(a) of a Korean Patent Application No. 10-2013-0125410, filed on Oct. 21, 2013, in the Korean Intellectual Property Office, the entire disclosures of which are incorporated herein by reference for all purposes.

BACKGROUND

1. Field

The following description relates to a method of controlling interference in a multi-hop network based on a multiple-input multiple-output (MIMO) system, and a relay node and a node pair using the method.

2. Description of Related Art

Communication systems have been used to connect only person to person. Therefore, only a small number of devices currently operating worldwide are interconnected and used through the network. However, with development in communication technology and with a trend toward unification caused by device integration, a variety of devices including a smart phone, a sensor device, and other communication devices are constructing a huge network. Furthermore, lots of users of communication terminals are using various applications, such as content sharing, synchronization, output, and games, more easily through a direct connection between devices. To cope with such demands for a market change, wireless access technologies are used, which support device-to-device (D2D) communication beyond cellular communication using a conventional infrastructure.

The D2D communication used to be a transmission method presuming a single hop. However, the D2D communication is expected to use a multi-hop afterward. General conventional relay methods have been using a plurality of relay nodes to obtain a diversity gain or a multiplexing gain, presuming a single source node and a single destination node. However, simultaneous signal transmission by a plurality of node pairs will be frequently performed as in a multiple unicast multi-hop network. Accordingly, research has been conducted for a method of controlling interferences between a plurality of node pairs and a plurality of relay nodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of controlling interference of relay nodes and node pairs in a multi-hop network, the method including relaying signals received from source nodes among the node pairs to destination nodes pairing with the source nodes, and cancelling a part of interference signals between the node pairs by controlling channel coefficients of the relay nodes. The destination nodes are configured to cancel residual interference signals among the interference signals, using the signals received by the destination nodes.

The cancelling of the part of the interference signals may include generating an effective interference channel matrix corresponding to the part of the interference signals based on interference channel matrices between the source nodes and the destination nodes, generating a reference matrix indicating a null space of the effective interference channel matrix by controlling the channel coefficients, and cancelling the part of the interference signals, using the effective interference channel matrix and the reference matrix.

The generating of the effective interference channel matrix may include obtaining a first channel matrix corresponding to a part of first interference signals between the source nodes and the relay nodes, and a second channel matrix corresponding to a part of second interference signals between the relay nodes and the destination nodes, and generating the effective interference channel matrix based on the first channel matrix and the second channel matrix.

The generating of the effective interference channel matrix may include transposing the first channel matrix, and calculating Kronecker products of the second channel matrix and the transposed first channel matrix.

The reference matrix may be included in the null space of the effective interference channel matrix, and includes null space vectors except a zero vector.

A number of the relay nodes may be less than a number of relay nodes designed to cancel all of the interference signals.

The relaying and cancelling may be performed in a signal transmission process performed between the relay nodes and the node pairs, and the signal transmission process may be performed using at least one of a time division method and a frequency division method.

The source nodes and/or the destination nodes may be configured to use a multiple-input multiple-output (MIMO) method, and the method may further include cancelling internal interference signals between antennas included in each of the node pairs.

The cancelling of the internal interference signals may include cancelling the internal interference signals, using a zero-forcing beamforming method in a full-channel state information at transmitter environment in which channel state information between the source nodes and the destination nodes is present.

The cancelling of the internal interference signal may include cancelling the internal interference signals, using a successive interference cancellation method based on a part of the signals received by the destination nodes in a no-channel state information at transmitter environment in which channel state information between the source nodes and the destination nodes is absent.

The destination nodes may be configured to cancel the residual interference signals based on a part of signals received by the destination nodes in another signal transmission process between the relay nodes and the node pairs.

A number of signal transmission processes between the relay nodes and the node pairs may be greater than or equal to a number of the signals.

The relaying and the cancelling may be performed in a first signal transmission process, a second transmission process, and a third signal transmission process between the relay nodes and the node pairs in response to a number of the relay nodes being two.

The cancelling of the part of the interference signals may include cancelling remaining interference signals excluding a residual interference signal transmitted from an antenna included in a first source node to an antenna included in a second destination node, among the interference signals, in the first signal transmission process, cancelling remaining interference signals excluding a residual interference signal transmitted from an antenna included in a second source node to an antenna included in a first destination node, among the interference signals, in the second signal transmission process, and cancelling remaining interference signals excluding the residual interference signal transmitted from the antenna included in the first source node to the antenna included in the second destination node, and the residual interference signal transmitted from the antenna included in the second source node to the antenna included in the first destination node, among the interference signals, in the third signal transmission process.

The cancelling of the remaining interference signals of the third signal transmission process may include receiving, from the first source node, a signal same as the residual interference signal transmitted from the antenna of the first source node to the antenna of the second destination node in the first signal transmission process, and receiving, from the second source node, a signal same as the residual interference signal transmitted from the antenna of the second source node to the antenna of the first destination node in the second signal transmission process.

The destination nodes may be configured to cancel the residual interference signals of the third signal transmission process based on a part of the signals received by the destination nodes in the first signal transmission process and the second signal transmission process.

In another general aspect, there is provided a method of controlling interference of relay nodes and node pairs in a multi-hop network, the method including relaying signals received from source nodes among the node pairs to destination nodes pairing with the source nodes, and cancelling a part of interference signals between the node pairs by controlling channel coefficients of the relay nodes. The destination nodes are configured to cancel residual interference signals among the interference signals, using at least one of a real component signal and a complex component signal that are received by the destination nodes.

The part of the interference signals may include remaining interference signals excluding at least one of a residual interference signal transmitted from an antenna included in a first source node to an antenna included in a second destination node, and a residual interference signal transmitted from an antenna included in a second source node to an antenna included in a first destination node, among the interference signals.

In still another general aspect, there is provided a method of controlling interference of relay nodes in a multi-hop network, the method including relaying signals received from source nodes among node pairs to destination nodes pairing with the source nodes, and cancelling a part of interference signals between the node pairs by controlling channel coefficients of the relay nodes.

In yet another general aspect, there is provided a method of controlling interference of node pairs in a multi-hop network, the method including receiving signals from source nodes among the node pairs through relay nodes, and cancelling residual interference signals among interference signals between the node pairs, using the received signals.

The residual interference signals may include a residual interference signal transmitted from an antenna included in a first source node to an antenna included in a second destination node, and a residual interference signal transmitted from an antenna included in a second source node to an antenna included in a first destination node, among the interference signals.

In still another general aspect, there is provided a relay node in a multi-hop network, the relay node including a relay unit configured to relay signals received from a source node of a node pair to a destination node of the node pair that pairs with the source node, and an interference signal cancellation unit configured to cancel a part of interference signals between the node pair and another node pair by controlling a channel coefficient of the relay node.

The relay unit and the interference signal cancellation unit may be executed in a signal transmission process between the relay node and the node pair.

In yet another general aspect, there is provided a destination node of a node pair in a multi-hop network, the destination node including a receiver configured to receive signals from a source node of the node pair through a relay node, and a residual interference signal cancellation unit configured to cancel residual interference signals among interference signals between the node pair and another node pair, using the received signals.

The receiver and the residual interference signal cancellation unit may be executed in a signal transmission process between the relay node and the node pair.

The residual interference signal cancellation unit may be configured to cancel the residual interference signals based on a part of the received signals in another signal transmission process between the relay node and the node pair.

The source node and the destination node may be configured to use a MIMO method, and the destination node may further include an internal interference signal cancellation unit configured to cancel internal interference signals between antennas included in the node pair.

Other features and aspects will be apparent from the following detailed description, the drawings, and the claims.

Figure 1:
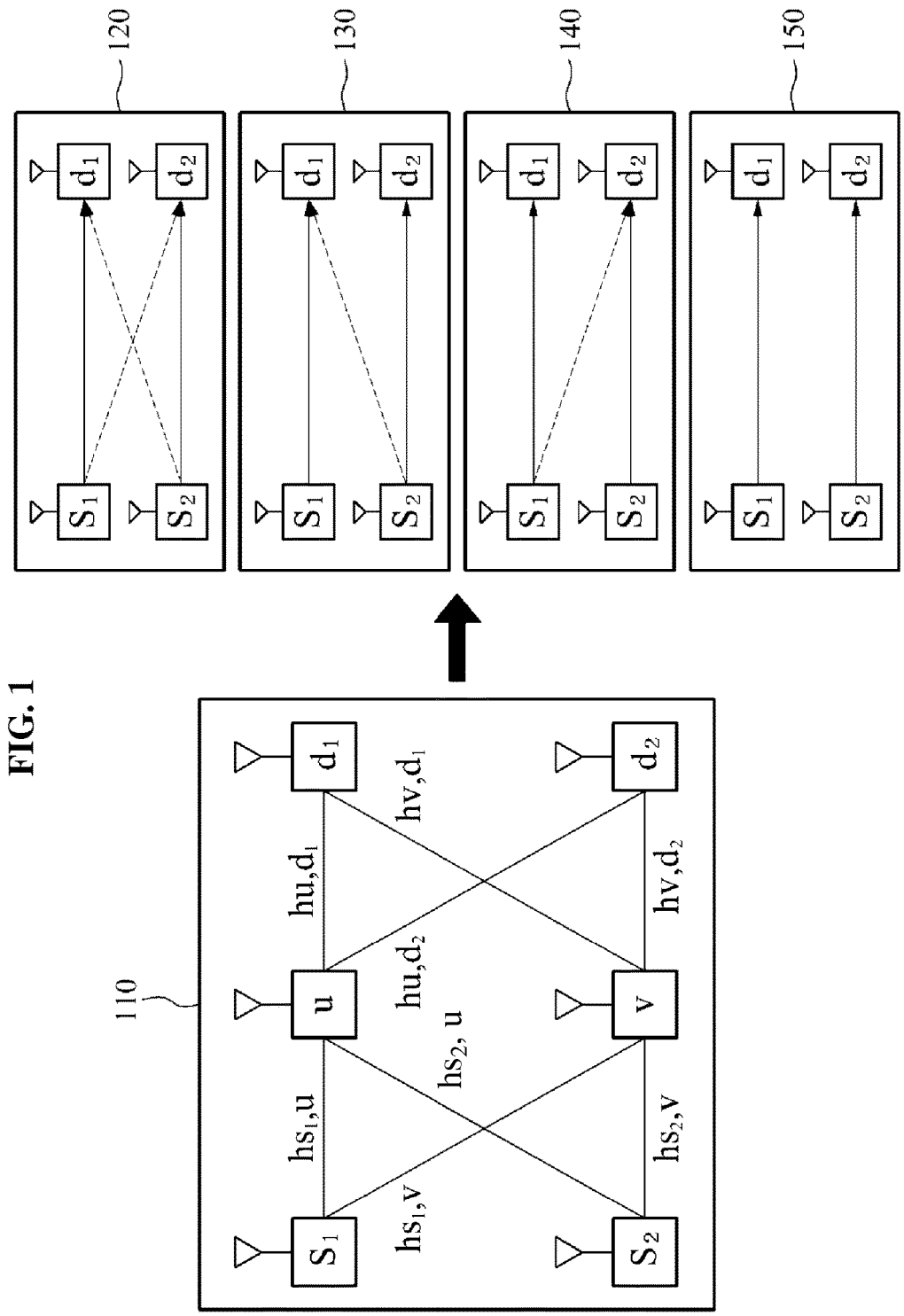
FIG. 1 is a diagram illustrating an example of a multi-hop network and an alternating topology.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a multi-hop network 110 and an alternating topology. Referring to FIG. 1, the multi-hop network 110 includes at least two source nodes, at least two relay nodes, and at least two destination nodes. For example, the multi-hop network 110 may include a K-number of source nodes, a K-number of relay nodes, and a K-number of destination nodes. In the multi-hop network 110, source nodes may transmit signals to destination nodes through relay nodes. Transmission of data to a plurality of base stations through a plurality of relays by multiple users belonging to a cellular system may be an example of the multi-hop network 110. When a plurality of node pairs simultaneously transmits signals, an inter-stream interference may be generated as signals or streams between different node pairs are mixed during multi-hopping. Therefore, a method of controlling interference in the multi-hop network through cooperation between relay nodes and node pairs will be introduced.

In the multi-hop network 110, and $s_1$ and $s_2$ denote source nodes, u and v denote relay nodes, and $d_1$ and $d_2$ denote destination nodes. When the source node $s_1$ transmits signals to the destination node $d_1$, the source node $s_1$ and the destination node $d_1$ form a pair. Each source node $s_i$ may include signals to be transmitted to each destination node $d_i$ (i∈{1,2}), forming a corresponding pair. $H_1$ denotes a channel matrix between source nodes and relay nodes, and may be expressed as $$H_1 = \begin{bmatrix} h_{s_1,u} & h_{s_2,u} \\ h_{s_1,v} & h_{s_2,v} \end{bmatrix}.$$

$H_2$ denotes a channel between relay nodes and destination nodes and may be expressed as $$H_2 = \begin{bmatrix} h_{u,d_1} & h_{v,d_1} \\ h_{u,d_2} & h_{v,d_2} \end{bmatrix}.$$

In an example, a channel gain may be a real number, and may be deduced by continuous distribution. Channel matrices may be fixed while the node pairs and the relay nodes are performing communication. The channel matrices may be known to all nodes.

In a time slot k, a transmission signal of the source node $s_i$ may be defined as $X_{i,k} \in \mathbb{R}$. A transmission signal in a relay node r may be defined as $X_{r,k} \in \mathbb{R}$ In the time slot k, a received signal $Y_{r,k}$ in the relay node r may be expressed as shown in Equation 1, and a received signal $Y_{i,k}$ in the destination node $d_i$ may be expressed as shown in Equation 2.

$$Y_{r,k} = h_{s_1,r} X_{1,k} + h_{s_2,r} X_{2,k} + Z_{r,k}, r \in \{u,v\}, k \in \mathbb{N}, \quad \text{[Equation 1]}$$

$$Y_{i,k} = h_{u,d_i} X_{u,k} + h_{v,d_i} X_{v,k} + Z_{d_i,k}, i \in \{1,2\}, k \in \mathbb{N}, \quad \text{[Equation 2]}$$

In Equations 1 and 2, and $Z_{r,k}$, and $Z_{d_i,k}$, may denote an independently and identically distributed (i.i.d) noise of the relay node and an i.i.d noise of the destination node, respectively, and comply with distribution of N(0,1). $X^n$ may define a random column vector $[X_1 \ X_2 \ \ldots \ X_n]^T$. When $S \subseteq \{1, 2, \ldots, n\}$, $X^S$ may be defined as $\{X_k | k \in S\}$.

An example of the interference control method in the multi-hop network may control interference of the multi-hop network through cooperation between the relay nodes and the node pairs. The relay nodes may generate an alternating topology such as a topology 120 to a topology 150 by controlling a channel coefficient to cancel an interference link. The alternating topology refers to a network between source nodes and destination nodes, and the network may be equivalently expressed by a change in connectivity of the interference link according to time or frequency. The node pairs may transmit and receive signals using the alternating topology. For example, when a K-number of node pairs transmits an N-number of signals simultaneously, a K-number of source nodes may transmit the N-number of signals through an M-number of transmission processes (M≥N). In this example, since the channel coefficients of the relay nodes are varied according to the transmission processes, a level of an interference signal that the K-number of destination nodes receive from the source nodes not in the pairs may be varied. That is, the interference link from the plurality of source nodes to the plurality of destination nodes is varied according to the transmission processes.

For example, in the topology 120, an interference link from the source node $s_1$ to the destination node $d_2$ and an interference link from the source node $s_2$ to the destination node $d_1$ are both present. In the topology 130, the interference link from the source node $s_2$ to the destination node $d_1$ is present, but the interference link from the source node $s_1$ to the destination node $d_2$ is absent. In the topology 140, the interference link from the source node $s_1$ to the destination node $d_2$ is present, but the interference link from the source node $s_2$ to the destination node $d_1$ is absent. In the topology 150, the interference link from the source node $s_1$ to the destination node $d_2$ and the interference link from the source node $s_2$ to the destination node $d_1$ are both absent.

Figure 2:
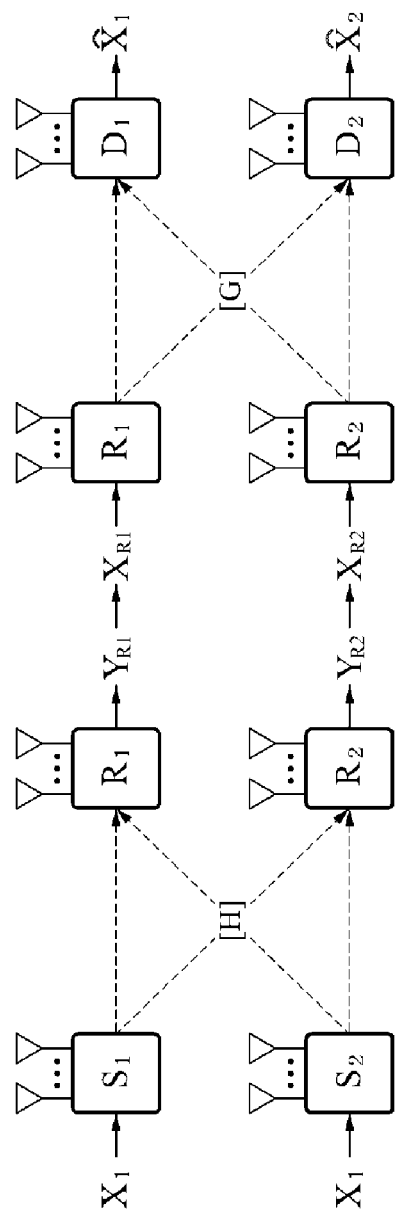
FIG. 2 is a diagram illustrating an example of a multi-hop network based on a multiple-input multiple-output (MIMO) system.

FIG. 2 is a diagram illustrating an example of a multi-hop network based on a multiple-input multiple-output (MIMO) system. Referring to FIG. 2, the multi-hop network based on the MIMO system includes at least two source nodes, at least two relay nodes, and at least two destination nodes. For example, the multi-hop network may include a K-number of source nodes, an L-number of relay nodes, and a K-number of destination nodes.

Hereinafter, for convenience of explanation, it will be presumed that K is 2 and L is 2. The source nodes may include simultaneous transmitting nodes using a same frequency, while the relay nodes may be cooperative relay nodes operating in a half-duplex.

The source nodes and the destination nodes may each include at least two antennas. The relay nodes may each include at least one antenna. For example, a source terminal and a destination terminal may both include an M-number of antennas, and an i-th relay terminal may include an $N_i$-number of antennas.

The source nodes may form pairs with the destination nodes, respectively. Hereinafter, it is presumed that a first source node $S_1$ intends to transmit data to a first destination node $D_1$, and a second source node $S_2$ intends to transmit data to a second destination node $D_2$. In this example, the first source node $S_1$ forms a pair with the first destination node $D_1$, and the second source node $S_2$ forms a pair with the second destination node $D_2$.

The first source node $S_1$ transmits data to the first destination node $D_1$ through two relay nodes. The second source node $S_2$ transmits data to the second destination node $D_2$ through two relay nodes.

A channel between a plurality of antennas included in each source node and the at least one antenna included in each relay node is a first-hop channel, which may be expressed by a first channel matrix H. For example, referring to Equation 3, the first channel matrix H may be a matrix having a size $$\sum_{j=1}^{L} N_j \times MK.$$

$$\underbrace{\begin{bmatrix} h_{1,1} & h_{1,2} & \cdots & h_{1,K} \\ h_{2,1} & h_{2,2} & & h_{2,K} \\ \vdots & \vdots & \vdots & \vdots \\ h_{L,1} & h_{L,2} & \cdots & h_{L,K} \end{bmatrix}}_{\sum_{j=1}^{L} N_j \times MK}.$$ [Equation 3]

A received signal vector received by an i-th relay node through the first-hop channel may be expressed by Equation 4.

$$y_l^{[R]} = \sum_{i=1}^{K} H_{l,i} x_i^{[S]} + z_l$$ [Equation 4]

In Equation 4, $y_l^{[R]}$, $l \in (1, 2, \ldots, L)$ denotes a channel output vector of an $Nl \times 1$ size and $H_{l,i}$ denotes a channel matrix of an $Nl \times M$ size from an i-th source node to an l-th relay node. $z_l$ denotes a noise vector received by the l-th relay node.

The i-th relay node may generate a new transmission signal $x_l^{[R]}$ based on the received $y_l^{[R]}$. The new transmission signal $x_l^{[R]}$ generated by the i-th relay node may be expressed by Equation 5.

$$x_l^{[R]} = W_l y_l^{[R]}$$ [Equation 5]

In Equation 5, $W_l$ denotes a relay beam forming matrix having a $N_l \times N_l$ size.

A channel between the at least one antenna included in each relay node and the plurality of antennas included in each destination node is a second-hop channel, which may be expressed by a second channel matrix G. For example, referring to Equation 6, the second channel matrix G may be a matrix having a size $$MK \times \sum_{j=1}^{L} N_j.$$

$$\underbrace{\begin{bmatrix} g_{1,1} & g_{1,2} & \cdots & g_{1,L} \\ g_{2,1} & g_{2,2} & & g_{2,L} \\ \vdots & \vdots & \vdots & \vdots \\ g_{K,1} & g_{K,2} & \cdots & g_{K,L} \end{bmatrix}}_{MK \times \sum_{j=1}^{L} N_j}.$$ [Equation 6]

A received signal vector received by a j-th destination node through the second-hop channel may be expressed by Equation 7.

$$y_j^{[D]} = \sum_{l=1}^{L} G_{j,l} x_l^{[R]} + n_j,$$ [Equation 7]

In Equation 7, $G_{j,l}$ denotes a channel matrix having an $M \times Nl$ size from the l-th relay node to the j-th destination node. $n_j$ denotes a noise vector received by the j-th destination node.

Hereinafter, inter-user interference cancellation and intra-user interference cancellation between node pairs in the multi-hop network based on the MIMO system will be described in detail.

Figure 3A:
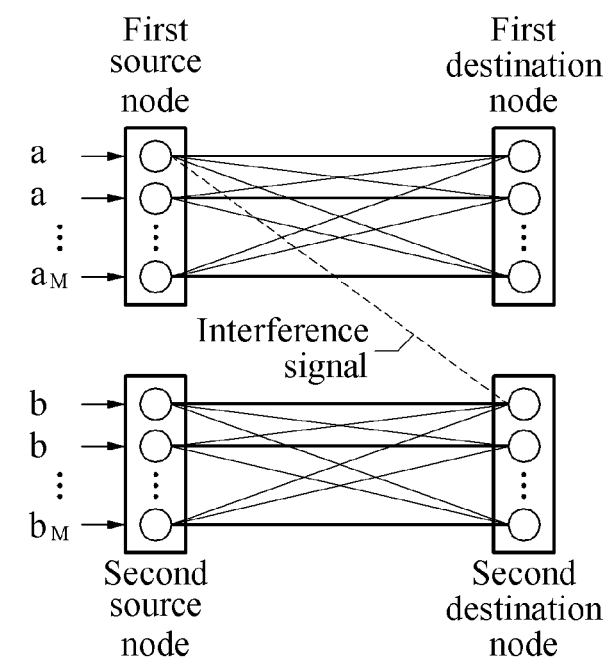
FIGS. 3A to 3C are diagrams illustrating an example of cancellation of at least a part of interference signals between node pairs.
Figure 3B:
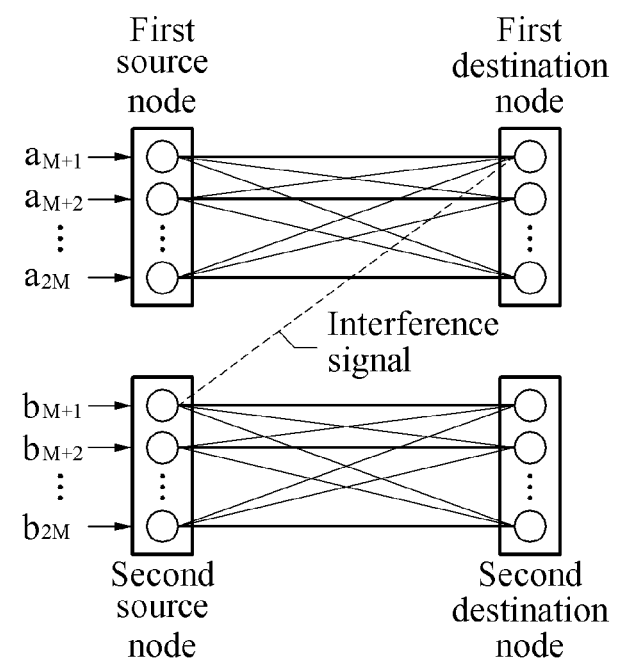
Figure 3C:
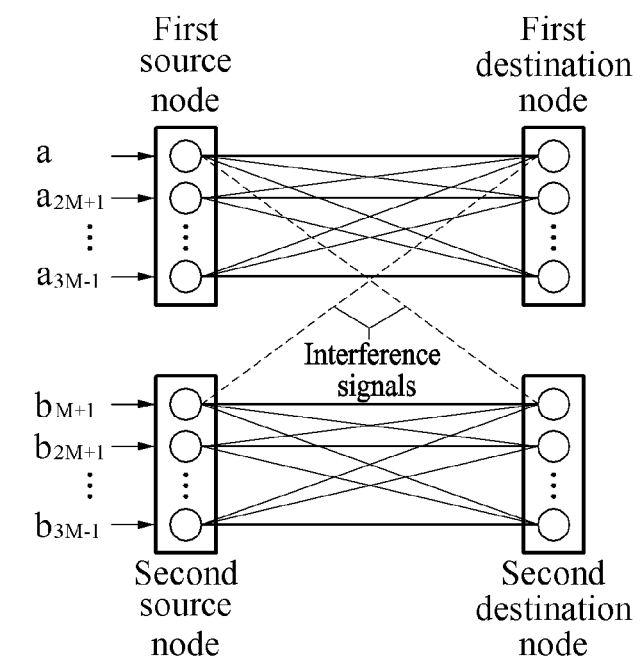

FIGS. 3A to 3C are diagrams illustrating an example of cancellation of at least a part of interference signals between node pairs. Referring to FIGS. 3A to 3C, relay nodes may relay signals received from source nodes of the node pairs to destination nodes pairing with the source nodes. The relay node may cancel the at least a part of interference signals between at least two node pairs through an interference neutralization method by controlling a channel coefficient.

In an example, the relay nodes may prevent the destination nodes from being interfered with signals transmitted by remaining source nodes other than the source nodes pairing with the destination nodes, by using a relay beamforming matrix considering both the first-hop channel and the second-hop channel. In this example, the relay nodes may perform linear beamforming.

According to a number of the relay nodes, at least a part or all of the interference signals between the node pairs may be cancelled. The number of the relay nodes may be smaller than a number of relay nodes designed to cancel all the interference signals between the node pairs. In the interference neutralization method, the number of the relay nodes capable of cancelling all the interference signals between the node pairs may be expressed as $L \geq K(K-1)+1$, and the number of relay nodes capable of cancelling at least a part of the interference signals may be expressed as L<K(K−1)+1. In this example, L denotes the number of the relay nodes, and K denotes a number of the source nodes or destination nodes. In an example, the relay nodes may determine whether to cancel all of the interference signals or at least a part of the interference signals in consideration of the number of the node pairs and the number of the relay nodes.

When the Number of the Relay Nodes is L≥K(K−1)+1

When the number of the relay nodes is L≥K(K−1)+1, the relay nodes may cancel all of the interference signals between the node pairs. In this example, the received signals received by the destination nodes may be expressed by Equation 8.

$$\begin{bmatrix} y_1 \\ y_2 \end{bmatrix} = \begin{bmatrix} g_{11} & g_{12} & g_{13} \\ g_{21} & g_{22} & g_{23} \end{bmatrix} \begin{bmatrix} w_1 & 0 & 0 \\ 0 & w_2 & 0 \\ 0 & 0 & w_3 \end{bmatrix}$$
$$\begin{bmatrix} h_{11} & h_{12} \\ h_{21} & h_{22} \\ h_{31} & h_{32} \end{bmatrix} \begin{bmatrix} x_1 \\ x_2 \end{bmatrix} + \begin{bmatrix} \tilde{n}_1 \\ \tilde{n}_2 \end{bmatrix}$$
$$= \begin{bmatrix} \Lambda_1 & 0 \\ 0 & \Lambda_2 \end{bmatrix} \begin{bmatrix} x_1 \\ x_2 \end{bmatrix} + \begin{bmatrix} \tilde{n}_1 \\ \tilde{n}_2 \end{bmatrix}$$
[Equation 8]

In Equation 8, $x_i$ denotes a symbol transmitted by the i-th source node, $h_{ij}$ denotes a MIMO channel from a j-th source node to the i-th relay node, $g_{ij}$ denotes a MIMO channel from a j-th relay terminal to an i-th destination terminal, and $w_i$ denotes a beamforming matrix of the i-th relay terminal. $w_i$ may be generated through control of the channel coefficient.

In Equation 8, a fact that elements of an off-diagonal block matrix of $$\begin{bmatrix} \Lambda_1 & 0 \\ 0 & \Lambda_2 \end{bmatrix}$$

are zero means that the interference of remaining source nodes not pairing with particular destination nodes are cancelled.

In this example, all values other than $w_i$ may be given environmental values. For example, the relay nodes may be aware of the values other than $w_i$ in advance by receiving a feedback from a base station. The relay nodes may make an entire effective channel become a block diagonal matrix using $w_i$.

A condition for cancelling the interference between the node pairs may be expressed by Equation 9.

$g_{11}w_1h_{12}+g_{12}w_2h_{21}+g_{13}w_3h_{32}=0_{M\times M}$ $g_{21}w_1h_{11}+g_{22}w_2h_{21}+g_{23}w_3h_{31}=0_{M\times M}$ [Equation 9]

Equation 10 is a relational expression according to property of column vector stacking related to a Kronecker product $\otimes$.

$\text{vec}(AXB)=(B^T \otimes A)\text{vec}(X)$ [Equation 10]

In Equation 10, vec(X) denotes calculation turning a matrix X into a vector. For example, when a size of the matrix X is m×n, a size of the vector vec(X) may be mn×1. Equation 9 may be altered to Equation 11 according to Equation 10.

$(h_{12}^T \otimes g_{11})\text{vec}(w_1)+(h_{22}^T \otimes g_{12})\text{vec}(w_2)+$
$(h_{32}^T \otimes g_{13})\text{vec}(w_3)=0_{M^2 \times 1}$ $(h_{11}^T \otimes g_{21})\text{vec}(w_1)+(h_{21}^T \otimes g_{22})\text{vec}(w_2)+$
$(h_{31}^T \otimes g_{23})\text{vec}(w_3)=0_{M^2 \times 1}$ [Equation 11]

In Equation 11, vec($W_k$) denotes a vector representation value generated by column vector stacking a relay beamforming matrix $w_k$.

A plurality of linear equations included in Equation 11 may be expressed in a matrix form of Equation 12.

$$\begin{bmatrix} h_{12}^T \otimes g_{11} & h_{22}^T \otimes g_{12} & h_{32}^T \otimes g_{13} \\ h_{11}^T \otimes g_{21} & h_{21}^T \otimes g_{22} & h_{31}^T \otimes g_{23} \end{bmatrix} \begin{bmatrix} vec(w_1) \\ vec(w_2) \\ vec(w_3) \end{bmatrix} =$$

$0_{2M^2 \times 1} \Rightarrow T\bar{w} = 0_{2M^2 \times 1}$ [Equation 12]

In Equation 12, a solution satisfying Equation 12 may be expressed by Equation 13. Since a matrix T is not a square matrix, a reference channel matrix $\bar{w}$ may always exist. A relay method according to an example may generate the matrix T, that is, an effective interference channel matrix, using Equation 12.

$\bar{w}=\text{null}(T)$ [Equation 13]

In Equation 13, null(A) denotes a null space of a matrix A. The null space of the matrix A may be a set of all vectors y satisfying Ay=0. Therefore, the relay node may obtain beamforming matrices for the plurality of relay terminals by turning vectors vec($w_i$) included in $\bar{w}$ by Equation 12 into matrices.

(2) When the Number of the Relay Nodes is L<K(K−1)+1

When the number of the relay nodes is L<K(K−1)+1, the relay nodes may cancel at least a part of the interference signals between the node pairs. For example, when the number of the node pairs is 2, the number of the relay nodes may be 2. In this example, received signals received by the destination nodes may be expressed as shown in Equation 14.

$$\begin{bmatrix} y_1 \\ y_2 \end{bmatrix} = \begin{bmatrix} g_{11} & g_{12} \\ g_{21} & g_{22} \end{bmatrix} \begin{bmatrix} w_1 & 0 \\ 0 & w_2 \end{bmatrix} \begin{bmatrix} h_{11} & h_{12} \\ h_{21} & h_{22} \end{bmatrix} \begin{bmatrix} x_1 \\ x_2 \end{bmatrix} +$$
$$\begin{bmatrix} \tilde{n}_1 \\ \tilde{n}_2 \end{bmatrix} = \begin{bmatrix} \Lambda_1 & 0 \\ 0 & \Lambda_2 \end{bmatrix} \begin{bmatrix} x_1 \\ x_2 \end{bmatrix} + \begin{bmatrix} \tilde{n}_1 \\ \tilde{n}_2 \end{bmatrix}$$
[Equation 14]

In Equation 14, $x_i$ denotes a symbol transmitted by the i-th source node, $h_{ij}$ denotes a MIMO channel from a j-th source node to the i-th relay node, $g_{ij}$ denotes a MIMO channel from a j-th relay terminal to an i-th destination terminal, and $w_i$ denotes a beamforming matrix of the i-th relay terminal. $w_i$ may be generated through control of the channel coefficient.

A condition for cancelling the interference between the node pairs may be expressed by Equation 15. Equation 15 may be transformed to Equation 16 according to Kronecker product calculation.

$g_{11}w_1h_{12}+g_{12}w_2h_{21}=0_{M\times M}$ $g_{21}w_1h_{11}+g_{22}w_2h_{21}=0_{M\times M}$ [Equation 15]

$(h_{12}^T \otimes g_{11})\text{vec}(w_1)+(h_{22}^T \otimes g_{12})\text{vec}(w_2)=0_{M^2 \times 1}$ $(h_{11}^T \otimes g_{21})\text{vec}(w_1)+(h_{21}^T \otimes g_{22})\text{vec}(w_2)=0_{M^2 \times 1}$ [Equation 16]

In Equation 16, vec($w_k$) denotes a vector representation value generated by column vector stacking a relay beamforming matrix $w_k$.

A plurality of linear equations included in Equation 16 may be expressed in a matrix form of Equation 17.

$$\begin{bmatrix} h_{12}^T \otimes g_{11} & h_{22}^T \otimes g_{12} \\ h_{11}^T \otimes g_{21} & h_{21}^T \otimes g_{22} \end{bmatrix} \begin{bmatrix} vec(w_1) \\ vec(w_2) \end{bmatrix} = \qquad \text{[Equation 17]}$$

$$0_{2M^2 \times 1} \Rightarrow T\overline{w} = 0_{2M^2 \times 1}$$

In this example, since an effective interference channel matrix T is a square matrix, the reference matrix $\overline{w}$ may not exist. Therefore, the relay nodes may cancel only a part of the interference signals between the node pairs by generating a beamforming matrix of the relay terminal by controlling the channel coefficient. The reference matrix may be included in a null space of the effective interference channel matrix, and may include a plurality of null space vectors excluding a zero vector.

In an example, the node pairs and the relay nodes may cancel the interference signals between the node pairs and internal interference signals by transmitting signals through a first transmission process to a third transmission process. FIGS. 3A to 3C show an example of an interference cancellation method of cancelling at least a part of the interference signals between the node pairs. A number of source antennas included in a source node and a number of destination antennas included in a destination node may be M. An antenna included in a first node pair may be expressed as from 1 to M. An antenna included in a second node pair may be expressed as from M+1 to 2M.

FIG. 3A illustrates the first transmission process that allows only an interference signal from an antenna 1 included in a first source node to an antenna M+1 included in a second destination node, and cancels remaining interference signals. FIG. 3B illustrates the second transmission process that allows only an interference signal from an antenna M+1 included in a second source node to an antenna 1 included in a first destination node, and cancels remaining interference signals. FIG. 3C illustrates the third transmission process that allows only the interference signal from the antenna 1 included in the first source node to the antenna M+1 included in the second destination node and the interference signal from the antenna M+1 included in the second source node to the antenna 1 included in the first destination node, and cancels remaining interference signals.

The first transmission process to the third transmission process may be performed using any one of a time division method and a frequency division method. When the first transmission process to the third transmission process are performed using the time division method, each of the transmission processes may correspond to each time slot. When the first transmission process to the third transmission process are performed using the frequency division method, each of the transmission processes may correspond to each frequency band. In an example, a number of the transmission processes may be greater than or equal to a number of signals transmitted from a source node to a destination node pairing with the corresponding source node.

FIG. 3A illustrates the first transmission process. Antennas of the first source node transmit signals $a_1$ to $a_M$. Antennas of the second source node transmit signals $b_1$ to $b_M$. To cancel at least a part of the interference signals between the node pairs, the relay node may allow only an interference signal from the antenna 1 included in the first source node to the antenna M+1 included in the second destination node while cancelling the remaining interference signals. In this example, a condition of cancelling the remaining signals excluding the interference signal from the antenna 1 included in the first source node to the antenna M+1 included in the second destination node may be expressed by Equation 18.

$$\underbrace{\begin{bmatrix} h_{1,M+1}^T \otimes g_{11} & h_{2,M+1}^T \otimes g_{12} \\ h_{1,M+2}^T \otimes g_{11} & h_{2,M+2}^T \otimes g_{12} \\ \vdots & \vdots \\ h_{1,2M}^T \otimes g_{M,1} & h_{2,2M}^T \otimes g_{M,2} \\ h_{1,2}^T \otimes g_{M+1,1} & h_{2,2}^T \otimes g_{M+1,2} \\ h_{1,3}^T \otimes g_{M+1,1} & h_{2,3}^T \otimes g_{M+1,2} \\ \vdots & \vdots \\ h_{1,M}^T \otimes g_{2M,1} & h_{2,M}^T \otimes g_{2M,2} \end{bmatrix}}_{T_{(2M^2-1) \times 2M^2}} \underbrace{\begin{bmatrix} vec(W_1) \\ vec(W_2) \end{bmatrix}}_{\overline{w}_{2M^2 \times 1}} = 0_{(2M^2-1) \times 1} \qquad \text{[Equation 18]}$$

In Equation 18, $h_{ij}$ denotes the MIMO channel from a j-th antenna included in the source node to the i-th relay node, that is, a first channel matrix corresponding to the at least a part of the interference signals between the source nodes and the relay nodes. $h_{ij}^T$ of Equation 18 may indicate that the first channel matrix is transposed. $g_{ij}$ denotes the MIMO channel from a j-th relay terminal to an i-th antenna included in the destination node, that is, a second channel matrix corresponding to the at least a part of the interference signals between the relay nodes and the destination nodes. $w_i$ denotes the beamforming matrix of the i-th relay terminal. Since only the interference signal from the antenna 1 included in the first source node to the antenna M+1 included in the second destination node is allowed, a component $h_{1,1}^T \otimes g_{M+1,1}$ indicating the interference signal transmitted from the antenna 1 of the first source node to an antenna M+1 of the second destination node through the first relay node, and a component $h_{2,1}^T \otimes g_{M+1,2}$ indicating the interference signal transmitted from the antenna 1 of the first source node to the antenna M+1 of the second destination node through the second relay node, may be excluded from the effect channel matrix of Equation 18. Accordingly, a number of linear equations in the effective channel matrix may be $2M^2-1$, and a size of the effective channel matrix may be $(2M^2-1) \times 2M^2$. A size of the reference matrix $\overline{w}$ may be $2M^2 \times 1$. The relay node may cancel the remaining interference signals excluding the interference signal from the antenna 1 of the first source node to the antenna M+1 of the second destination node, by controlling the channel coefficient to satisfy Equation 18.

FIG. 3B illustrates the second transmission process. Each antenna of the first source node transmit signals $a_{M+1}$ to $a_{2M}$. Each antenna of the second source node transmit signals $b_{M+1}$ to $b_{2M}$. To cancel at least a part of the interference signals between the node pairs, the relay node may allow only the interference signal from the antenna M+1 included in the second source node to the antenna 1 included in the first destination node while cancelling the remaining interference signals. In this example, a condition of cancelling the remaining interference signals excluding the interference signal from the antenna M+1 included in the second source node to the antenna 1 included in the first destination node may be expressed by Equation 19.

$$\underbrace{\begin{bmatrix} h_{1,M+2}^T \otimes g_{11} & h_{2,M+2}^T \otimes g_{12} \\ h_{1,M+3}^T \otimes g_{11} & h_{2,M+3}^T \otimes g_{12} \\ \vdots & \vdots \\ h_{1,2M}^T \otimes g_{M,1} & h_{2,2M}^T \otimes g_{M,2} \\ h_{1,1}^T \otimes g_{M+1,1} & h_{2,1}^T \otimes g_{M+1,2} \\ h_{1,2}^T \otimes g_{M+1,1} & h_{2,2}^T \otimes g_{M+1,2} \\ \vdots & \vdots \\ h_{1,M}^T \otimes g_{2M,1} & h_{2,M}^T \otimes g_{2M,2} \end{bmatrix}}_{T_{(2M^2-1) \times 2M^2}} \underbrace{\begin{bmatrix} vec(W_1) \\ vec(W_2) \end{bmatrix}}_{\overline{w}_{2M^2 \times 1}} = 0_{(2M^2-1) \times 1} \quad \text{[Equation 19]}$$

In FIG. 3B, since only the interference signal from the antenna M+1 included in the second source node to the antenna 1 included in the first destination node is allowed, a component $h_{1,M+1}^T \otimes g_{11}$ indicating the interference signal transmitted from the antenna M+1 of the second source node to an antenna 1 of the first destination node through the first relay node, and a component $h_{2,M+1}^T \otimes g_{12}$ indicating the interference signal transmitted from the antenna M+1 of the second source node to the antenna 1 of the first destination node through the second relay node, may be excluded from the effective channel matrix of Equation 19. Accordingly, a number of linear equations in the effective channel matrix may be $2M^2-1$ and a size of the effective channel matrix may be $(2M^2-1) \times 2M^2$. A size of the reference matrix $\overline{w}$ may be $2M^2 \times 1$. The relay node may cancel the remaining interference signals excluding the interference signal from the antenna M+1 of the second source node to the antenna 1 of the first destination node, by controlling the channel coefficient to satisfy Equation 19.

FIG. 3C illustrates the third transmission process. Each antenna of the first source node transmits signals $a_1$, $a2_{M+1}$ to $a_{3M-1}$. Each antenna of the second source node transmit signals $b_{M+1}$, $b2_{M+1}$ to $b_{3M-1}$. To cancel at least a part of the interference signals between the node pairs, the relay node may allow only the interference signal from the antenna 1 included in the first source node to the antenna M+1 included in the second destination node and the interference signal from the antenna M+1 included in the second source node to the antenna 1 included in the first destination node, while cancelling the remaining interference signals. In this example, a condition of cancelling the remaining interference signals excluding the interference signal from the antenna 1 included in the first source node to the antenna M+1 included in the second destination node and the interference signal from the antenna M+1 included in the second source node to the antenna 1 included in the first destination node may be expressed by Equation 20.

$$\underbrace{\begin{bmatrix} h_{1,M+2}^T \otimes g_{11} & h_{2,M+2}^T \otimes g_{12} \\ h_{1,M+3}^T \otimes g_{11} & h_{2,M+3}^T \otimes g_{12} \\ \vdots & \vdots \\ h_{1,2M}^T \otimes g_{M,1} & h_{2,2M}^T \otimes g_{M,2} \\ h_{1,2}^T \otimes g_{M+1,1} & h_{2,2}^T \otimes g_{M+1,2} \\ h_{1,3}^T \otimes g_{M+1,1} & h_{2,3}^T \otimes g_{M+1,2} \\ \vdots & \vdots \\ h_{1,M}^T \otimes g_{2M,1} & h_{2,M}^T \otimes g_{2M,2} \end{bmatrix}}_{T_{(2M^2-1) \times 2M^2}} \underbrace{\begin{bmatrix} vec(W_1) \\ vec(W_2) \end{bmatrix}}_{\overline{w}_{2M^2 \times 1}} = 0_{(2M^2-1) \times 1} \quad \text{[Equation 20]}$$

In the third transmission process, the relay node may receive a signal same as an interference signal transmitted from any one antenna of the first source node to any one antenna of the second destination node in the first transmission process, for example, the signal $a_1$, from the first source node, and may receive a signal same as an interference signal transmitted from any one antenna of the second source node to any one antenna of the first destination node in the second transmission process, for example, the signal $b_{M+1}$, from the second source node.

Since only the interference signal from the antenna 1 of the first source node to the antenna M+1 of the second destination node, and the interference signal from the antenna M+1 of the second source node to the antenna 1 of the first destination node, are allowed, a component $h_{1,1}^T \otimes g_{M+1,1}$ indicating an interference signal transmitted from the antenna 1 of the first source node to the antenna M+1 of the second destination node through the first relay node, a component $h_{2,1}^T \otimes g_{M+1,2}$ indicating an interference signal transmitted from the antenna 1 of the first source node to the antenna M+1 of the second destination node through the second relay node, a component $h_{1,M+1}^T \otimes g_{11}$ indicating an interference signal transmitted from the antenna M+1 of the second source node to the antenna 1 of the first destination node through the first relay node, and a component $h_{2,M+1}^T \otimes g_{12}$ indicating an interference signal transmitted from the antenna M+1 of the second source node to the antenna 1 of the first destination node through the second relay node, may be excluded from the effective channel matrix of Equation 20. Therefore, a number of linear equations of the effective channel matrix may be $2M^2-2$ and a size of the effective channel matrix may be $(2M^2-2) \times 2M^2$. A size of the reference matrix $\overline{w}$ may be $2M^2 \times 1$. The relay node may cancel the remaining interference signals excluding the interference from the antenna 1 of the first source node to the antenna M+1 of the second destination node, and the interference signal from the antenna M+1 of the second source node to the antenna 1 of the first destination node, by controlling the channel coefficient to satisfy Equation 20.

Figure 4A:
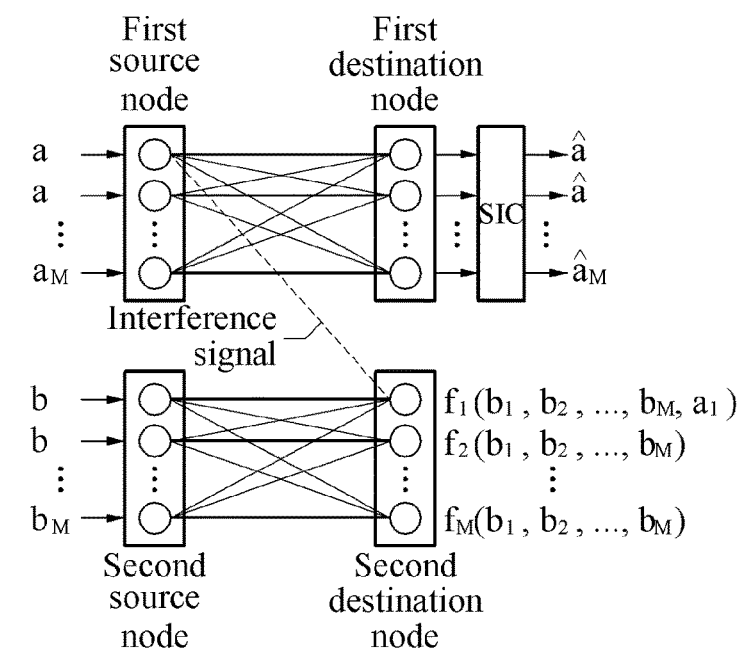
FIGS. 4A to 4E are diagrams illustrating an example of cancellation of a residual interference signal among interference signals between node pairs when transmission channel information is absent.

FIGS. 4A to 4E are diagrams illustrating an example of cancellation of a residual interference signal among interference signals between node pairs when transmission channel information is absent, that is, in a no-channel state information at transmitter (No-CSIT) environment. Referring to FIG. 4A, in the No-CSIT environment, internal interference between node pairs may be cancelled by applying a successive interference cancellation (SIC) method with respect to a destination node. The SIC method is applicable when a number of variables of an application object is equal to a number of equations. Therefore, in the examples of FIGS. 4A to 4E, the SIC method may be applied when a number of signals received by each antenna of the destination node is equal to a number of antennas of the destination node.

FIG. 4A illustrates a method of cancelling internal interference and residual interference between the node pairs in the first transmission process of FIG. 3. In FIG. 4A, an M-number of antennas of the first destination node may each receive an M-number of signals including an (M−1)-number of interference signals, for example, the signals $a_1$ to $a_M$, from an M-number of antennas of the first source node. Since the SIC method may be applied to the first destination node, the first destination node may extract the signals $a_1$ to $a_M$. Accordingly, the internal interference between the node pairs of the first destination node may be cancelled.

Antennas M+2 to 2M of the second destination node may not receive the M-number of signals including (M−1)- number of interference signals from an M-number of antennas of a second source node. The antenna M+1 of the second destination node may receive an M-number of signals, for example, the signals $b_1$ to $b_M$, from an M-number of antennas of the second source node, and also receive one interference signal, for example, the signal $a_1$, from the antenna 1 of the first source node. Since the second destination node receives an (M+1)-number of signals, the number of signals received by each antenna of the second destination node may be different from a number of antennas of the second destination node. Therefore, the SIC method may not be applied to the second destination node of FIG. 4A.

Figure 4B:
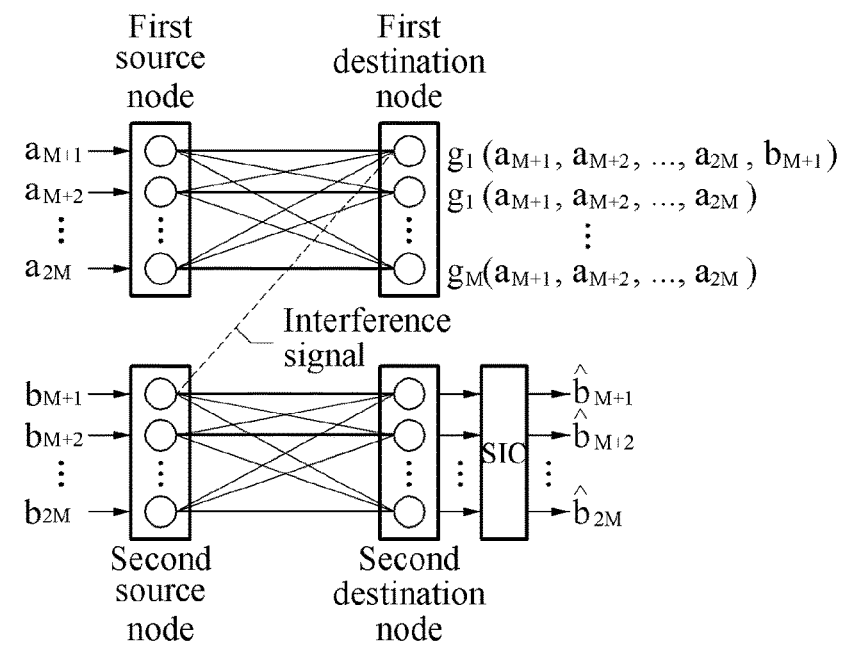

FIG. 4B illustrates a method of cancelling internal interference and residual interference between the node pairs in the second transmission process of FIG. 3. In FIG. 4B, antennas from an antenna 2 to an antenna M of the first destination node may each receive an M-number of signals including an (M−1)-number of interference signals. The antenna 1 of the first destination node may receive an M-number of signals, for example, the signals $a_{M+1}$ to $a_{2M}$, from an M-number of antennas of the first source node, and may also receive one interference signal, for example, the signal $b_{M+1}$, from the antenna M+1 of the second source node. Since the first destination node receives the (M+1)-number of signals, a number of signals received by each antenna of the first destination node may be different from a number of antennas of the first destination node. Therefore, the SIC method may not be applied to the first destination node.

An M-number of antennas of the second destination node may each receive an M-number of signals including an (M−1)-number of interference signals, for example the signals $b_{M+1}$ to $b_{2M}$, from the M-number of antennas of the second source node. Therefore, the SIC method may be applied to the second destination node, and the second destination node may extract the signals $b_{M+1}$ to $b_{2M}$. Accordingly, the internal interference between the node pairs of the first destination node may be cancelled.

Figure 4C:
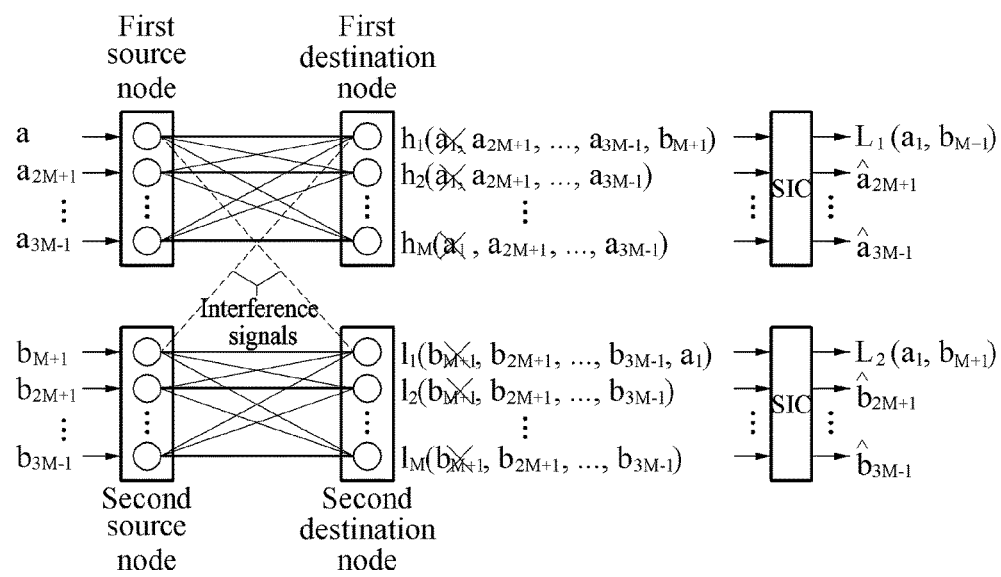

FIG. 4C illustrates a method of cancelling internal interference and residual interference between the node pairs in the third transmission process of FIG. 3. In FIG. 4C, the antenna 1 of the first destination node may receive an M-number of signals, for example, the signals $a_1$, $a2_{M+1}$ to $a_{3M−1}$, from the M-number of antennas of the first source node, and may also receive one interference signal, for example, the signal $b_{M+1}$, from the antenna M+1 of the second source node. The antenna M+1 of the second destination node may receive an M-number of signals, for example, the signals $b_{M+1}$, $b2_{M+1}$ to $b_{3M−1}$, from the M-number of antennas of the second source node, and may also receive one interference signal, for example the signal $a_1$, from the antenna 1 of the first source node. Since the first destination node and the second destination node receive the (M+1)-number of signals, the number of the signals received by the antennas of the first destination node and the second destination node may be different from the number of antennas of the first destination node and the second destination node. Accordingly, the SIC method may not be applied to the first destination node and the second destination node of FIG. 4C.

To apply the SIC method to the first destination node and the second destination node of FIG. 4C, the first destination node may exclude the signal $a_1$ extracted in the first transmission process of FIG. 4A from application objects of the SIC method, whereas the second destination node excludes the signal $b_{M+1}$ extracted in the second transmission process of FIG. 4B from the application objects of the SIC method.

For example, since the signal $a_1$ and the signal $b_{M+1}$ are extracted in advance by the first destination node and the second destination node, respectively, the first destination node and the second destination node may consider the signal $a_1$ and the signal $b_{M+1}$ as constants, and therefore exclude the signal $a_1$ and the signal $b_{M+1}$ from the application objects of the SIC method. Since the signal $a_1$ and the signal $b_{M+1}$ are excluded, a number of variables of the application objects of the SIC method may become equal to the number of equations. Accordingly, the SIC method may be applied to the first destination node and the second destination node.

Therefore, the first destination node may extract signals $L_1(a_1, b_{M+1})$, and $a_{2M+1}$ to $a_{3M−1}$, and the second destination node may extract signals $L_2(a_1, b_{M+1})$, and $b_{2M+1}$ to $b_{3M−1}$. The signal $L_1(a_1, b_{M+1})$ and the signal $L_2(a_1, b_{M+1})$ refer to equations in which the signals $a_1$ and $b_{M+1}$ are linearly combined. Since the SIC method is applied to the first destination node and the second destination node, the internal interference between the node pairs in the first destination node and the second destination node may be cancelled. The first destination node may extract the signal $b_{M+1}$ by applying the signal $a_1$ extracted in the first transmission process of FIG. 4A to the signal $L_1(a_1, b_{M+1})$. The second destination node may extract the signal $a_1$ by applying the signal $b_{M+1}$ extracted in the second transmission process of FIG. 4B to the signal $L_2(a_1, b_{M+1})$. Thus, since the interference signal $b_{M+1}$ received by the antenna 1 of the first destination node and the interference signal $a_1$ received by the antenna M+1 of the second destination node are extracted, the residual interference between the node pairs of the third transmission process may be cancelled.

Figure 4D:
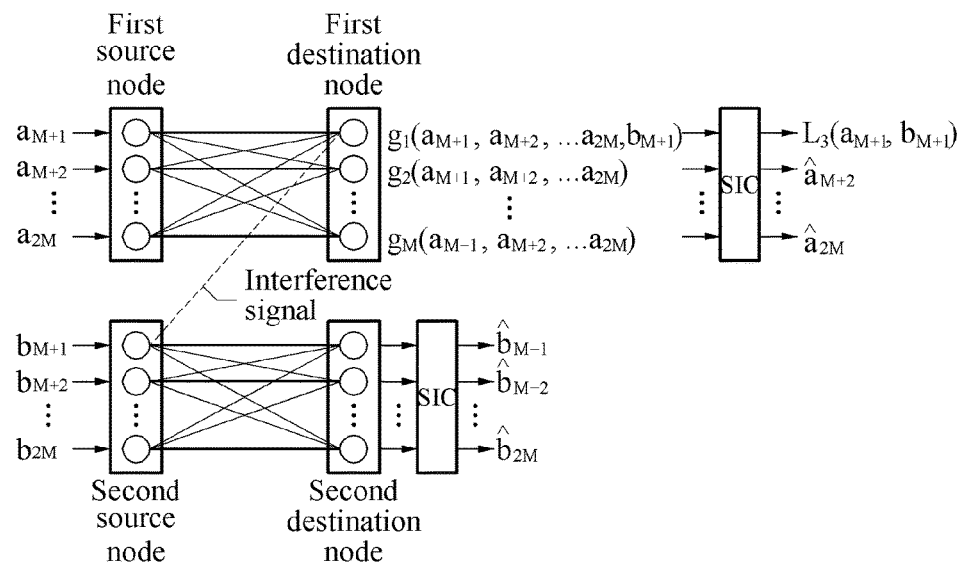

FIG. 4D illustrates a method of cancelling residual interference of the first node pair of the second transmission process of FIG. 4A. In FIG. 4D, the antenna 1 of the first destination node may receive the M-number of signals, for example, the signals $a_{M+1}$ to $a_{2M}$, from the M-number of antennas of the first source node, and may also receive one interference signal, for example, the signal $b_{M+1}$, from the antenna M+1 of the second source node. Since the first destination node receives the (M+1)-number of signals, the number of signals received by each antenna of the first destination node may be different from the number of the antennas of the first destination node. Therefore, the SIC method may not be applied to the first destination node of FIG. 4D.

To apply the SIC method to the first destination node of FIG. 4D, the first destination node may exclude the signal $b_{M+1}$ extracted in the third transmission method of FIG. 4C from the application objects of the SIC method. Since the signal $b_{M+1}$ is excluded, the number of the variables of the application objects of the SIC method may become equal to the number of the equations. Thus, the SIC method may be applied to the first destination node, and therefore the first destination node may extract the signals $L_3(a_{M+1}, b_{M+1})$, and $a_{M+2}$ to $a_{2M}$. The signal $L_3(a_{M+1}, b_{M+1})$ may refer to an equation in which the signal $a_{M+1}$ and the signal $b_{M+1}$ are linearly combined. Since the SIC method is applied to the first destination node, the internal interference between the node pairs of the first destination node may be cancelled. The first destination node may extract the signal $a_{M+1}$ by applying the signal $b_{M+1}$ extracted in the third transmission process of FIG. 4C to the signal $L_3(a_{M+1}, b_{M+1})$. Since the signal $a_{M+1}$ received by the antenna 1 of the first destination node and the interference signal $b_{M+1}$ are extracted, the residual interference between the node pairs in the second transmission process may be cancelled.

Figure 4E:
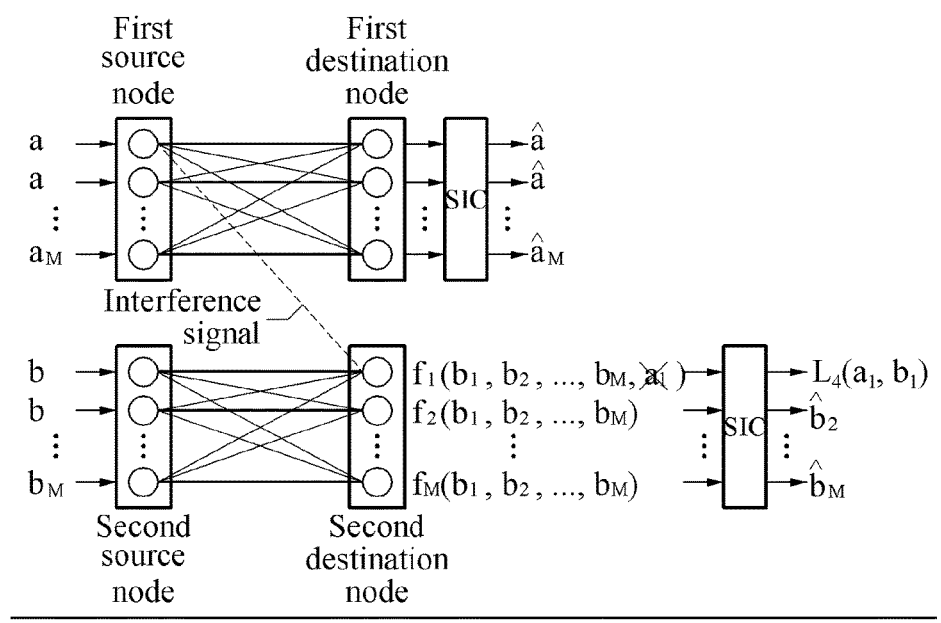

FIG. 4E illustrates a method of cancelling residual interference of the second node pair of the first transmission process of FIG. 4A. In FIG. 4E, the antenna M+1 of the second destination node may receive the M-number of signals, for example, the signals $b_1$ to $b_M$, from the M-number of antennas of the second source node, and may also receive one interference signal, for example, the signal $a_1$, from the antenna 1 of the first source node. Since the second destination node receives an (M+1)-number of signals, the number of signals received by each antenna of the second destination node may be different from the number of the antennas of the second destination node. Therefore, the SIC method may not be applied to the second destination node of FIG. 4E.

To apply the SIC method to the second destination node, the second destination node may exclude the signal $a_1$ extracted in the third transmission process of FIG. 4C from the application objects of the SIC method. Since the signal $a_1$ is excluded, the number of the variables of the application objects of the SIC method may become equal to the number of the equations. Thus, the SIC method may be applied to the second destination node, and therefore the second destination node may extract the signals $L_4(a_1, b_1)$, and $b_2$ to $b_M$. The signal $L_4(a_1, b_1)$ may refer to an equation in which the signal $a_1$ and the signal $b_1$ are linearly combined. Since the SIC method is applied to the second destination node, the internal interference between the node pairs of the second destination node may be cancelled. The second destination node may extract the signal $b_1$ by applying the signal $a_1$ extracted in the third transmission process of FIG. 4C to the signal $L_4(a_1, b_1)$. Since the signal $b_1$ received by the antenna M+1 of the second destination node and the interference signal $a_1$ are extracted, the residual interference between the node pairs in the first transmission process may be cancelled.

In the first transmission process and the second transmission process, each of the first source node and the second source node may transmit an M-number of signals other than the interference signal. In the third transmission process, each of the first source node and the second source node may transmit an (M−1)-number of signals. In the first to third transmission processes, the first destination node and the second destination node may each receive a 3M-number of signals including one interference signal, thereby extracting an (3M−1)-number of signals. In each transmission process, each node pair may obtain degrees of freedom (DoF) of $$M - \frac{1}{3},$$

and obtain a sum DoF of $$2M - \frac{2}{3}.$$

That is, as the number of antennas increases, the DoF may be even doubled as maximum in comparison to in a time division multiplexer (TDM) method.

FIGS. 5A to 5F are diagrams illustrating an example of cancellation of a residual interference signal among interference signals between node pairs when entire transmission channel information is present, that is, in a Full-CSIT environment. Referring to FIGS. 5A to 5F, in the full-CSIT environment, the internal interference between the node pairs may be cancelled by applying a zero-forcing beamforming (ZFBF) method to a source node.

Figure 5A:
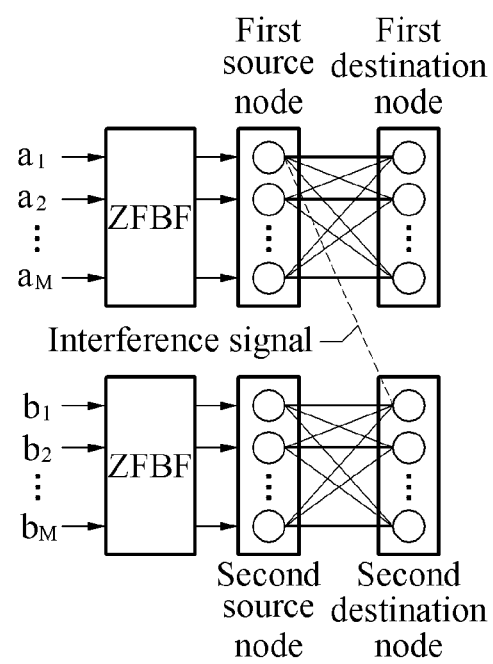
FIGS. 5A to 5F are diagrams illustrating an example of cancellation of a residual interference signal among interference signals between node pairs when entire transmission channel information is present.
Figure 5B:
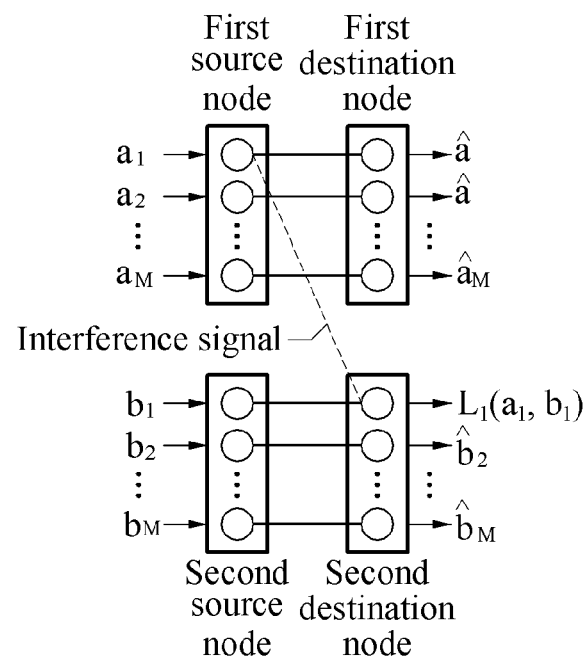

FIGS. 5A and 5B illustrate the method of cancelling the internal interference and the residual interference of the first transmission process of FIG. 3. In FIG. 5A, each of the M-number of antennas of the first source node transmits the M-number of signals including the (M−1)-number of interference signals, for example, the signals $a_1$ to $a_M$, to the M-number of antennas of the first destination node. The antenna 1 of the first source node transmits one interference signal, for example, the signal $a_1$, to the antenna M+1 of the second destination node. Each of the M-number of antennas of the second source node transmits the M-number of signals including the (M−1)-number of interference signals, for example, the signals $b_1$ to $b_M$, to the M-number of antennas of the second destination node. Since the ZFBF method is applied to the first source node and the second source node, the internal interference between the node pairs in the first destination node and the second destination node may be cancelled. Referring to FIG. 5B, since the internal interference is cancelled, the first destination node may extract the signals $a_1$ to $a_M$, and the second destination node may extract the signals $L_1(a_1, b_1)$, and $b_1$ to $b_M$. The signal $L_1(a_1, b_1)$ may refer to an equation in which the signal $a_1$ and the signal $b_1$ are linearly combined.

Figure 5C:
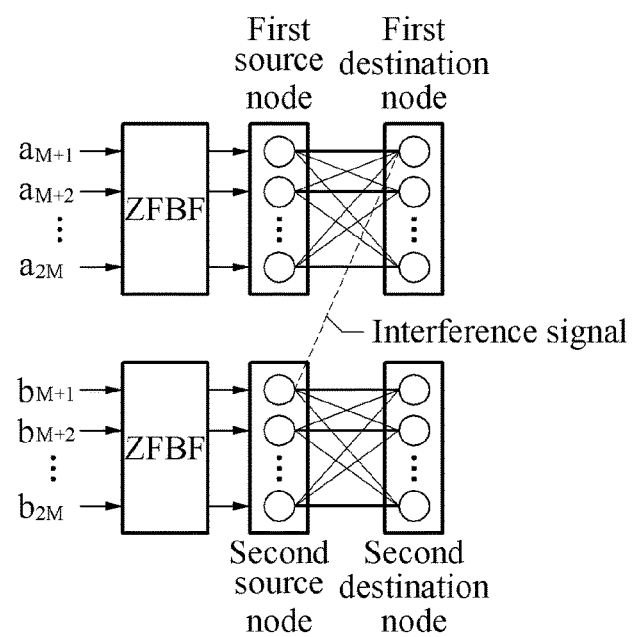
Figure 5D:
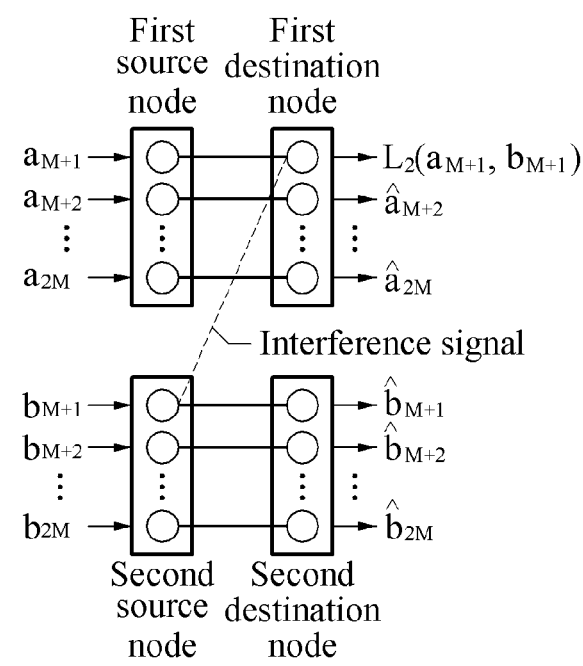

FIGS. 5C and 5D illustrate the method of cancelling the internal interference and the residual interference of the second transmission process of FIG. 3. In FIG. 5C, each of the M-number of antennas of the first source node transmits the M-number of signals including the (M−1)-number of interference signals, for example, the signals $a_{M+1}$ to $a_{2M+1}$, to the M-number of antennas of the first destination node. Each of the M-number of antennas of the second source node transmits the M-number of signals including the (M−1)-number of interference signals, for example, the signals $b_{M+1}$ to $b_{2M}$, to the M-number of antennas of the second destination node. The antenna M+1 of the second source node transmits one interference signal, for example, the signal $b_{M+1}$, to the antenna 1 of the first destination node. Since the ZFBF method is applied to the first source node and the second source node, the internal interference between the node pairs of the first destination node and the second destination node may be cancelled. Referring to FIG. 5D, therefore, the first destination node may extract the interference $L_2(a_{M+1}, b_{M+1})$, and $a_{M+2}$ to $a_{2M}$, and the second destination node may extract the signals $b_{M+1}$ to $b_{2M}$.

Figure 5E:
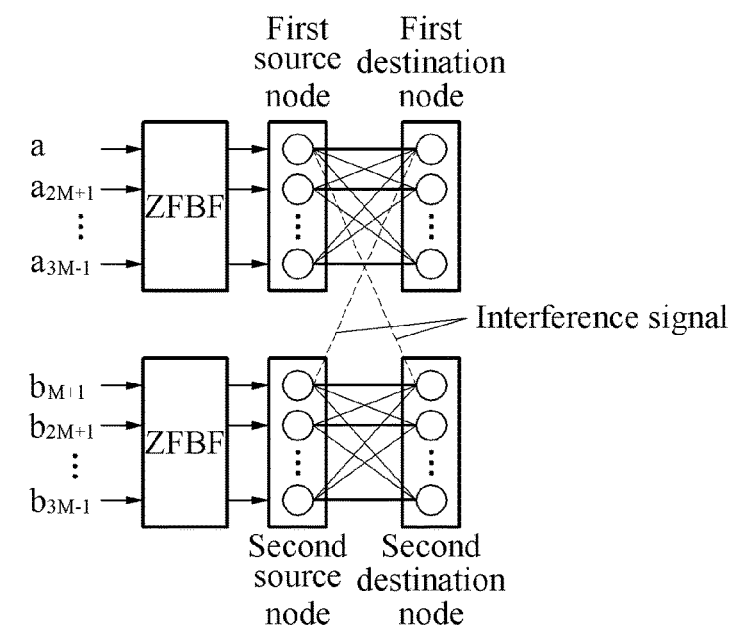
Figure 5F:
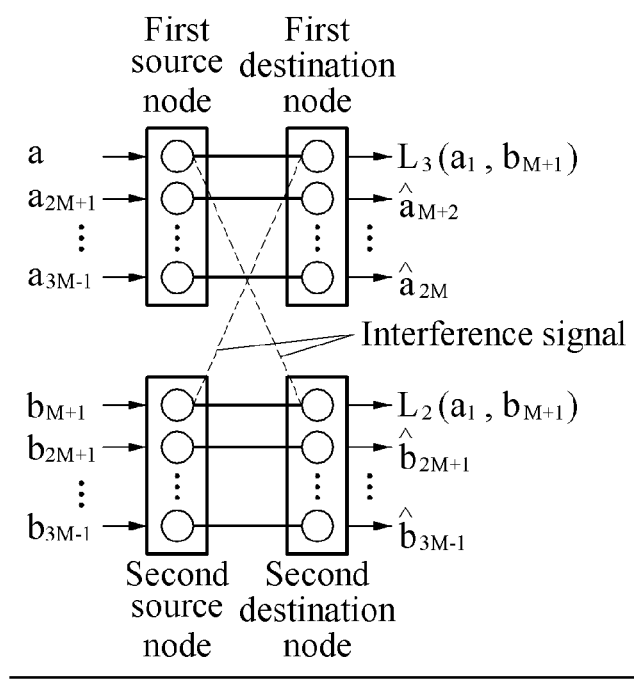

FIGS. 5E and F illustrate a method of cancelling internal interference and residual interference between the node pairs in the third transmission process of FIG. 3. In FIG. 5E, each of the M-number of antennas of the first source node transmit the M-number of signals including the (M−1)-number of interference signals, for example, the signals $a_1$, and $a_{2M+1}$ to $a_{3M-1}$, to the M-number of antennas of the first destination node. The antenna 1 of the first source node transmits one interference signal, for example, the signal $a_1$, to the antenna M+1 of the second destination node. Each of the M-number of antennas of the second source node transmits the M-number of signals including the (M−1)-number of interference signals, for example, the signals $b_{M+1}$, and $b_{2M+1}$ to $b_{3M-1}$, to the M-number of antennas of the second destination node. The antenna M+1 of the second source node transmits one interference signal, for example, the signal $b_{M+1}$, to the antenna 1 of the first destination node. Since the ZFBF method is applied to the first source node and the second source node, the internal interference between the node pairs of the first destination node and the second destination node may be cancelled. Referring to FIG.

5F, therefore, the first destination node may extract the interference $L_3(a_1, b_{M+1})$, and $a_{2M+2}$ to $a_{3M-1}$, and the second destination node may extract the signals $L_4(a_1, b_{M+1})$, and $b_{2M+1}$ to $b_{3M-1}$.

The first destination node may extract the signal $b_{M+1}$ by applying the signal $a_1$ extracted in the first transmission process to the signal $L_3(a_1, b_{M+1})$. The second destination node may extract the signal $a_1$ by applying the signal $b_{M+1}$ extracted in the second transmission process to the signal $L_4(a_1, b_{M+1})$. Thus, since the interference signal $b_{M+1}$ received by the antenna 1 of the first destination node, and the interference signal $a_1$ received by the antenna M+1 of the second destination node are extracted, the residual interference between the node pairs of the third transmission process may be cancelled.

In the first transmission process, the second destination node may extract the signal $b_1$ by applying the interference signal $a_1$ extracted in the third transmission process to the signal $L_1(a_1, b_1)$ of the first transmission process. Since the signal $b_1$ received by the antenna M+1 of the second destination node and the interference signal $a_1$ are extracted, the residual interference between the node pairs of the first transmission process may be cancelled.

In the second transmission process, the first destination node may extract the signal $a_{M+1}$ by applying the interference signal $b_{M+1}$ extracted in the third transmission process to the signal $L_2(a_{M+1}, b_{M+1})$ of the second transmission process. Since the signal $a_{M+1}$ received by the antenna 1 of the first destination node and the interference signal $b_{M+1}$ are extracted, the residual interference between the node pairs of the second transmission process may be cancelled.

In each transmission process, each node pair may obtain DoF of $$M - \frac{1}{3},$$

and obtain a sum DoF of $$2M - \frac{2}{3}.$$

That is, as the number of antennas increases, the DoF may be even doubled as maximum in comparison to in the TDM method.

In the above description about the interference control method in the multi-hop network, it is presumed that the number of the node pairs is two and the number of the relay nodes is two. However, the aforementioned example is not limiting. For example, when the number of the node pairs is three, the number of the relay nodes may become six to perform the interference control method.

Figure 6A:
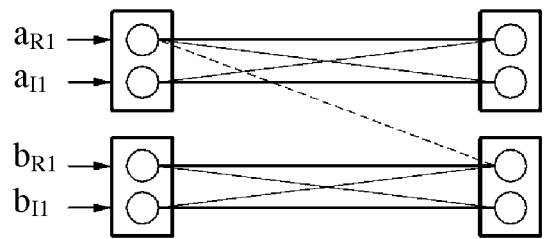
FIGS. 6A to 6C are diagram illustrating an example of an interference control method in a multi-hop network in a single-input single-output (SISO) system.
Figure 6B:
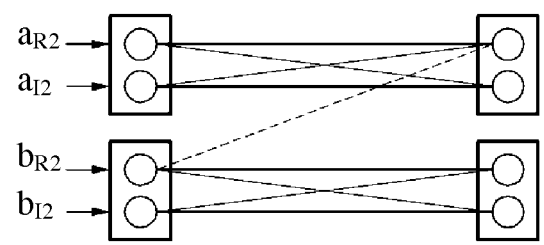
Figure 6C:
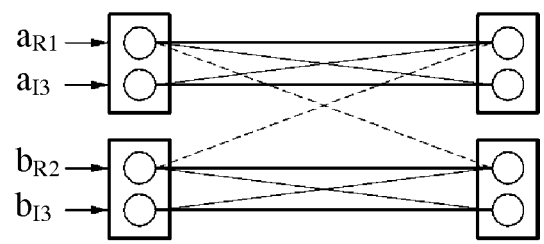

≤FIGS. 6A to 6C are diagram illustrating an example of an interference control method in a multi-hop network in a single-input single-output (SISO) system. Referring to FIGS. 6A to 6C, in the SISO system, relay nodes may relay signals received from source nodes of node pairs to destination nodes pairing with the source nodes. The source nodes may separate signals into a real component signal and a complex component signal, and transmit the separated signals to the destination nodes pairing with the source nodes. The relay nodes may relay the real component signal and the complex component signal to the destination nodes pairing with the source nodes. In an example, a channel matrix from the source node to the relay node may be expressed as $$\begin{bmatrix} h_R & -h_I \\ h_I & h_R \end{bmatrix},$$

which may correspond to a channel matrix from a source node having two antennas to a relay node in a MIMO system. Therefore, when the signals are transmitted as being separated into the real component signal and the complex component signal in the SISO system, the method of cancelling interference between node pairs in the multi-hop network, and the method of cancelling internal interference and residual interference between node pairs, may be applied to the SISO system.

In an example, when the number of the node pairs is two, and the number of the relay nodes is two, the relay nodes may cancel at least a part of interference signals between the node pairs, by controlling the channel coefficient. The destination node may cancel residual interference signals among the interference signals between at least two node pairs, using at least one of the real component signal and the complex component signal received by the relay nodes. For example, the node pairs and the relay nodes may transmit signals through the aforementioned first transmission process to third transmission process.

FIG. 6A illustrates the first transmission process. In the first transmission process, the first source node transmits a real component signal $a_{R1}$ and a complex component signal $a_{I1}$, and the second source node transmits a real component signal $b_{R1}$ and a complex component signal $b_{I1}$. To cancel at least a part of the interference signals between the node pairs, the relay nodes may allow only the real component signal $a_{R1}$ of the first source node transmitted to the second destination node while cancelling remaining interference signals, by controlling the channel coefficient.

FIG. 6B illustrates the second transmission process. In the second transmission process, the first source node transmits a real component signal $a_{R2}$ and a complex component signal $a_{I2}$, and the second source node transmits a real component signal $b_{R2}$ and the complex component signal $b_{I2}$. To cancel at least a part of the interference signals between the node pairs, the relay node may allow only the real component signal $b_{R2}$ of the second source node transmitted to the first destination node while cancelling remaining interference signals, by controlling the channel coefficient.

FIG. 6C illustrates the third transmission process. In the third transmission process, the first source node transmits the real component signal $a_{R1}$ and a complex component signal $a_{I3}$, and the second source node transmits the real component signal $b_{R2}$ and the complex component signal $b_{I3}$. To cancel at least a part of the interference signals between the node pairs, the relay node may allow only the real component signal $a_{R1}$ of the first source node transmitted to the second destination node, and the real component signal $b_{R2}$ of the second source node transmitted to the first destination node, while cancelling remaining interference signals, by controlling the channel coefficient.

In the example of the No-CSIT environment, the internal interference between the node pairs may be cancelled by applying the SIC method to the destination node. In the first transmission process, the first destination node may extract the real component signal $a_{R1}$ and the complex component signal $a_{I1}$, by cancelling the internal interference between the first node pair using the SIC method.

In the second transmission process, the second destination node may extract the real component signal $b_{R2}$ and the complex component signal $b_{I2}$, by cancelling the internal interference between the second node pair using the SIC method.

In the third transmission process, the first destination node may extract the signal $L_1(a_{R1}, b_{R2})$ and the complex component signal $a_{I3}$ by excluding the real component signal $a_{R1}$ extracted in the first transmission process from the application objects of the SIC method. The second destination node may extract the signal $L_2(a_{R1}, b_{R2})$ and the complex component signal $b_{I3}$, by excluding the real component signal $b_{R2}$ extracted in the second transmission process from the application objects of the SIC method. Since the SIC method is applied to the first destination node and the second destination node, the internal interference between the node pairs may be cancelled in the first destination node and the second destination node. The first destination node may extract the real component signal $b_{R2}$ by applying the real component signal $a_{R1}$ extracted in the first transmission process to the signal $L_1(a_{R1}, b_{R2})$. The second destination node may extract the real component signal $a_{R1}$ by applying the real component signal $b_{R2}$ extracted in the second transmission process to the signal $L_2(a_{R1}, b_{R2})$. Since the interference signal $b_{R2}$ received by the first destination node and the interference signal $a_{R1}$ received by the second destination node are extracted, the residual interference signal between the node pairs of the third transmission process may be cancelled.

In the second transmission process, the first destination node may extract the signal $L_3(a_{R2}, b_{R2})$ and the complex component signal $a_{I2}$ by cancelling the internal interference between the first node pair by excluding the real component signal $b_{R2}$ extracted in the third transmission process from the application objects of the SIC method. The first destination node may extract the signal $a_{R2}$ by applying the real component signal $b_{R2}$ extracted in the third transmission process to the signal $L_3(a_{R2}, b_{R2})$. Since the signal $a_{R2}$ received by the first destination node and the interference signal $b_{R2}$ are extracted, the residual interference between the node pairs of the second transmission process may be cancelled.

In the first transmission process, the second destination node may extract the signal $L_4(a_{R1}, b_{R1})$ and the complex component signal $b_{I1}$ by cancelling the internal interference between the second node pair by excluding the real component signal $a_{R1}$ extracted in the third transmission process from the application objects of the SIC method. The second destination node may extract the signal $b_{R1}$ by applying the real component signal $a_{R1}$ extracted in the third transmission process to the signal $L_4(a_{R1}, b_{R1})$. Since the signal $b_{R1}$ received by the second destination node and the interference signal $a_{R1}$ are extracted, the residual interference between the node pairs of the first transmission process may be cancelled.

In the example of the Full-CSIT environment, the internal interference between the node pairs may be cancelled by applying the ZFBF method to the source node. In the first transmission process, the internal interference between the node pairs may be cancelled by applying the ZFBF method to the first source node and the second source node. When the internal interference is cancelled, the first destination node may extract the signals $a_{R1}$ and $a_{I1}$, and the second destination node may extract the signals $L_1(a_{R1}, b_{R1})$ and $b_{I1}$.

In the second transmission process, since the internal interference between the node pairs are cancelled by applying the ZFBF method to the first source node and the second source node, the first destination node may extract the signal $L_2(a_{R2}, b_{R2})$ and $a_{I2}$, and the second destination node may extract the signal $b_{R2}$ and $b_{I2}$.

In the third transmission process, since the internal interference between the node pairs are cancelled by applying the ZFBF method to the first source node and the second source node, the first destination node may extract the signal $L_3(a_{R1}, b_{R2})$ and $a_{I3}$, and the second destination node may extract the signal $L_4(a_{R1}, b_{R2})$ and $b_{I3}$. The first destination node may extract the real component signal $b_{R2}$ by applying the real component signal $a_{R1}$ extracted in the first transmission process to the signal $L_3(a_{R1}, b_{R2})$. The second destination node may extract the real component signal $a_{R1}$ by applying the real component signal $b_{R1}$ extracted in the second transmission process. Since the interference signal $b_{R2}$ received by the first destination node and the interference signal $a_{R1}$ received by the second destination node are extracted, the residual interference signal between the node pairs of the third transmission process may be cancelled.

In the second transmission process, the first destination node may extract the signal $a_{R2}$ by applying the real component signal $b_{R2}$ extracted in the third transmission process to the signal $L_2(a_{R2}, b_{R2})$. Since the signal $a_{R2}$ received by the first destination node and the interference signal $b_{R2}$ are extracted, the residual interference signal between the node pairs of the second transmission process may be cancelled.

In the first transmission process, the second destination node may extract the signal $N_{R1}$ by applying the real component signal $a_{R1}$ extracted in the third transmission process to the signal $L_1(a_{R1}, b_{R1})$. Since the signal $b_{R1}$ received by the second destination node and the interference signal $a_{R1}$ are extracted, the residual interference signal between the node pairs of the first transmission process may be cancelled.

In the No-CSIT environment and the Full-CSIT environment, the first destination node and the second destination node may obtain $$DoF\left(\frac{2M - \frac{2}{3}}{2}, M = 2\right)$$

of 5/3 through the first to third transmission processes.

Figure 7:
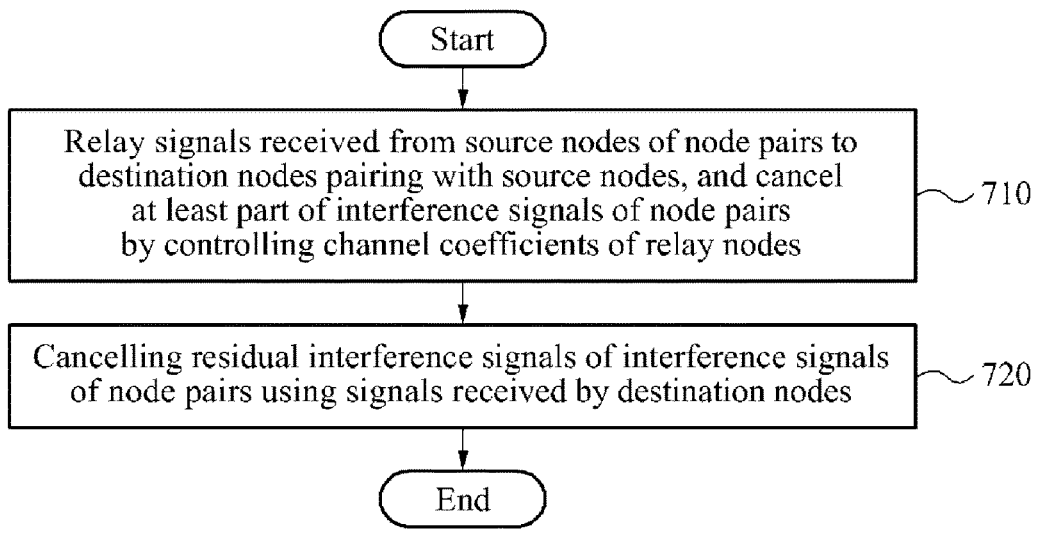
FIG. 7 is a flowchart illustrating an example of an interference control method in a multi-hop network.

FIG. 7 is a flowchart illustrating an example of an interference control method in a multi-hop network. Referring to FIG. 7, in operation 710, relay nodes relay signals received from source nodes of at least two node pairs to destination nodes pairing with the source nodes. In addition, the relay nodes cancel at least a part of interference signals between the node pairs by controlling channel coefficients of the relay nodes.

In operation 720, the node pairs (e.g., the destination nodes) cancel residual interference of the interference signals of the at least two node pairs, using the signals received by the destination nodes. Operations 710 and 720 are performed during signal transmission between the relay nodes and the node pairs.

Figure 8:
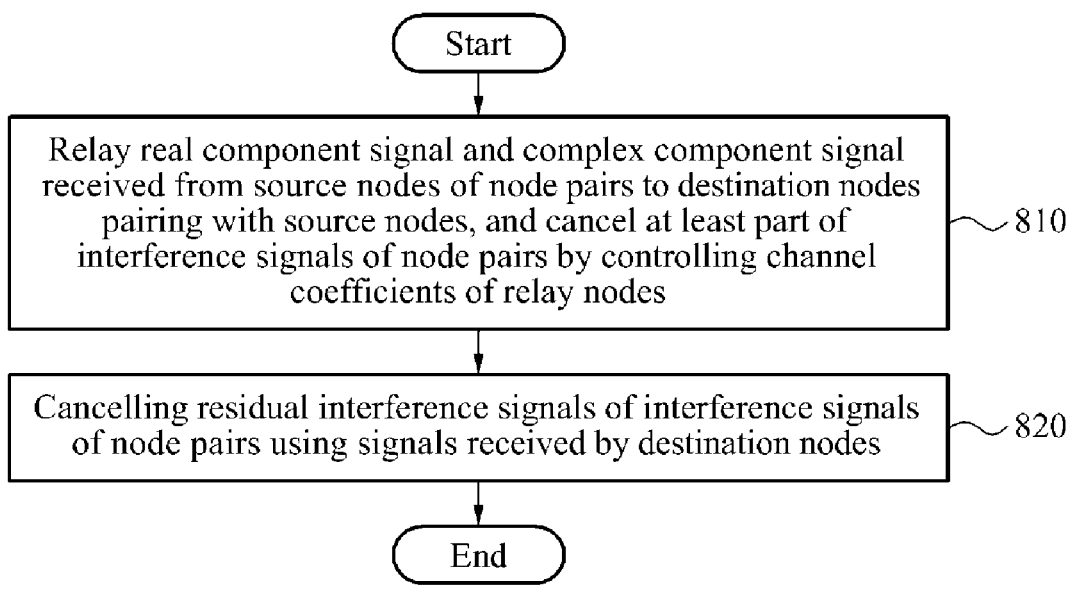
FIG. 8 is a flowchart illustrating an example of an interference control method in a multi-hop network in a SISO system.

FIG. 8 is a flowchart illustrating an example of an interference control method in a multi-hop network in a SISO system. Referring to FIG. 8, in operation 810, the relay nodes relay a real component signal and a complex component signal that are received from source nodes of at least two node pairs to destination nodes pairing with the source nodes. In addition, the relay nodes cancel at least a part of the interference signals between the node pairs by controlling channel coefficients of the relay nodes.

In operation 820, the node pairs (e.g., the destination nodes) cancel residual interference signals of the interference signals of the at least two node pairs, using at least one of the real component signal and the complex component signal that are received by the destination nodes. Operations 810 and 820 are performed during signal transmission between the relay nodes and the node pairs.

Since the technical features described with reference to FIGS. 1 to 6C may be directly applied to the interference control method in the multi-hop network of FIG. 7 and the interference control method in the multi-hop network in the SISO system of FIG. 8, a detailed description about the interference control methods of FIGS. 7 and 8 will be omitted.

Figure 9:
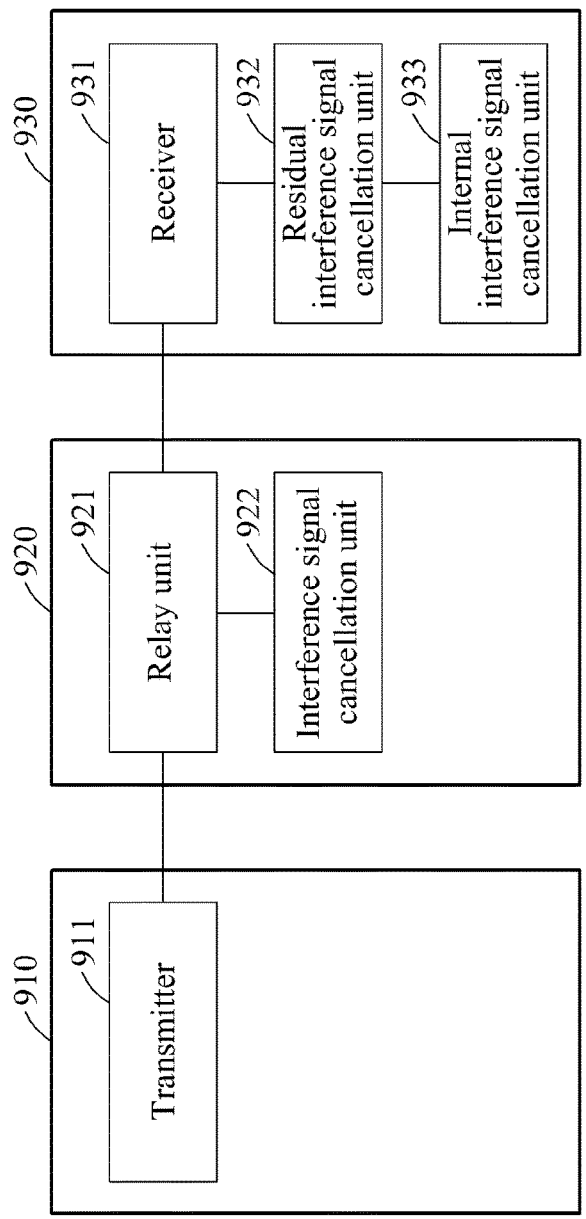
FIG. 9 is a block diagram illustrating an example of a node pair and a relay node.

FIG. 9 is a block diagram illustrating an example of a node pair and a relay node 920. Referring to FIG. 9, in the node pair including a source node 910 and a destination node 930, the source node 910 transmits a signal to the destination node 930 through the relay node 920. In an example, the source node 910, the relay node 920, and the destination node 930 may use a MIMO method.

The source node 910 includes a transmitter 911. The transmitter 911 transmits signals to the relay node 920. In an example, signals may include a real number component signal and an imaginary number component signal.

The relay node 920 includes a relay unit 921 and an interference signal cancellation unit 922. The relay unit 921 relays signals received from the source node 910 to the destination node 930 pairing with the source node 910.

The interference signal cancellation unit 922 cancels a part of interference signals between the node pair and another node pair by controlling a channel coefficient of the relay node 920. In an example, the interference signal cancellation unit 922 may generate an effective interference channel matrix corresponding to the part of the interference signals based on interference channel matrices between the source node 910 and the destination node 930. The interference signal cancellation unit 922 may obtain a first channel matrix corresponding to a part of first interference signals between the source node 910 and the relay node 920 and a second channel matrix corresponding to a part of second interference signals between the relay node 920 and the destination node 930, and may generate the effective interference channel matrix based on the first channel matrix and the second channel matrix. The interference signal cancellation unit 922 may generate the effective interference channel matrix by transposing the first channel matrix, and by calculating Kronecker products of the second channel matrix and the transposed first channel matrix. The interference signal cancellation unit 922 may generate a reference matrix indicating a null space of the effective interference channel matrix by controlling the channel coefficient. The reference matrix may be included in the null space of the effective interference channel matrix, and may include null space vectors except a zero vector. The interference signal cancellation unit 922 may cancel the part of the interference signals, using the effective interference channel matrix and the reference matrix.

In an example, the relay unit 921 and the interference signal cancellation unit 922 may be executed in a signal transmission process between the relay node 920 and the node pair, and the signal transmission process may be performed using at least one of a time division method and a frequency division method. A number of signal transmission processes may be greater than or equal to a number of signals relayed by the relay node 920.

The destination node 930 includes a receiver 931, a residual interference signal cancellation unit 932, and an internal interference signal cancellation unit 933. The receiver 931 receives signals from the source node 910 through the relay node 920.

The residual interference signal cancellation unit 932 cancels residual interference signals among interference signals between the node pair and another node pair, using the received signals. The receiver 931, the residual interference signal cancellation unit 932, and the internal interference signal cancellation unit 933 may be executed in a signal transmission process between the relay node 920 and the node pair. In an example, the residual interference signal cancellation unit 932 may cancel residual interference signals based on a part of received signals in another signal transmission process between the relay node 920 and the node pair. In an example, when signals received by the receiver 931 include at least one of a real number component signal and an imaginary number component signal, the residual interference signal cancellation unit 932 may cancel the residual interference signals among interference signals, using at least one of the real number component signal and the imaginary number component signal.

The internal interference signal cancellation unit 933 cancels internal interference signals between antennas included in each node pair. In an example, the internal interference signal cancellation unit 933 may cancel internal interference signals, using a ZFBF method in a Full-CSIT environment in which channel state information between the source node 910 and the destination node 930 is present. Also, the internal interference signal cancellation unit 933 may cancel internal interference signals, using a SIC method in a NO-CSIT environment in which channel state information between the source node 910 and the destination node 930 is absent.

Since the technical features described with reference to FIGS. 1 through 8 may be directly applied to the node pair and the relay node 920 of FIG. 9, a further detailed description related thereto will be omitted.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling interference of relay nodes and node pairs in a multi-hop network, the method comprising:
    relaying signals received from source nodes among node pairs to destination nodes pairing with the source nodes through a plurality of signal transmission processes; and
    cancelling a portion of interference signals between the node pairs, by
    generating an effective interference channel matrix corresponding to the portion of the interference signals, based on interference channel matrices between the source nodes and the destination nodes,
    generating a reference matrix indicating a null space of the effective interference channel matrix, by controlling the channel coefficients, and
    using the effective interference channel matrix and the reference matrix to cancel the portion of the interference signals;
    wherein channel coefficients of the relay nodes are varied according to the plurality of signal transmission processes.

2. The method of claim 1, wherein the generating of the effective interference channel matrix comprises:

obtaining a first channel matrix corresponding to a portion of first interference signals between the source nodes and the relay nodes, and a second channel matrix corresponding to a portion of second interference signals between the relay nodes and the destination nodes; and generating the effective interference channel matrix based on the first channel matrix and the second channel matrix.

3. The method of claim 2, wherein the generating of the effective interference channel matrix comprises:

transposing the first channel matrix; and calculating Kronecker products of the second channel matrix and the transposed first channel matrix.

4. The method of claim 1, wherein the reference matrix is included in the null space of the effective interference channel matrix, and comprises null space vectors except a zero vector.

5. The method of claim 1, wherein a quantity of the relay nodes is less than a quantity of relay nodes designed to cancel all of the interference signals.

6. The method of claim 1, wherein:

the plurality of signal transmission processes are performed using at least one of a time division method and a frequency division method.

7. The method of claim 1, wherein residual interference signals are canceled by the destination nodes, based on a portion of signals received by the destination nodes in the plurality of signal transmission processes between the relay nodes and the node pairs.

8. The method of claim 1, wherein a quantity of signal transmission processes between the relay nodes and the node pairs is greater than or equal to a quantity of the signals.

9. The method of claim 1, wherein the relaying and the cancelling are performed in a first signal transmission process, a second transmission process, and a third signal transmission process between the relay nodes and the node pairs in response to a quantity of the relay nodes being two.

10. The method of claim 9, wherein the cancelling of the portion of the interference signals comprises:

cancelling remaining interference signals among the interference signals, in the first signal transmission process, excluding a residual interference signal transmitted from an antenna included in a first source node to an antenna included in a second destination node;

cancelling remaining interference signals among the interference signals, in the second signal transmission process, excluding a residual interference signal transmitted from an antenna included in a second source node to an antenna included in a first destination node; and cancelling remaining interference signals among the interference signals, in the third signal transmission process, excluding the residual interference signal transmitted from the antenna included in the first source node to the antenna included in the second destination node, and excluding the residual interference signal transmitted from the antenna included in the second source node to the antenna included in the first destination node.

11. A relay node in a multi-hop network, the relay node comprising:

a relay unit, including a receiver and a transmitter, configured to receive signals from a source node of a node pair using the receiver, and to relay the received signals from the source node to a destination node of the node pair using the transmitter, through a plurality of signal transmission processes, wherein a channel coefficient of the relay unit is varied according to the plurality of signal transmission processes; and a processor configured to cancel a portion of interference signals between the node pair and another node pair, by generating an effective interference channel matrix corresponding to the portion of the interference signals, based on interference channel matrices between the source nodes and the destination nodes, generating a reference matrix indicating a null space of the effective interference channel matrix, by controlling the channel coefficients, and using the effective interference channel matrix and the reference matrix to cancel the portion of the interference signals.

12. A destination node of a node pair in a multi-hop network, the destination node comprising:

a receiver configured to receive signals from a source node of the node pair via a relay node through a plurality of signal transmission processes; and a processor configured to cancel residual interference signals among interference signals;

wherein a channel coefficient of the relay node is varied according to the plurality of signal transmission processes; and wherein a portion of the interference signals is canceled by the relay node, by generating an effective interference channel matrix corresponding to the portion of the interference signals, based on interference channel matrices between the source nodes and the destination nodes, generating a reference matrix indicating a null space of the effective interference channel matrix, by controlling the channel coefficients, and using the effective interference channel matrix and the reference matrix to cancel the portion of the interference signals.

13. The destination node of claim 12, wherein the receiver and the processor are executed in a signal transmission process between the relay node and the node pair.

14. The destination node of claim 12, wherein:

the destination node is configured to use a multiple-input multiple-output (MIMO) method; and the processor is further configured to cancel internal interference signals between antennas included in the node pair.

15. The destination node of claim 12, wherein the processor cancel the internal interference signals, using a zero-forcing beamforming method in a full-channel state information in a transmitter environment in which channel state information between source nodes and destination nodes is present.

16. The destination node of claim 12, wherein the processor cancel the internal interference signals, using a successive interference cancellation method based on a portion of the signals received by the receiver in a no-channel state information in a transmitter environment in which channel state information between source nodes and destination nodes is absent.

17. A method of controlling interference of a destination node of a node pair in a multi-hop network, the method comprising:

receiving signals from a source node of the node pair via a relay node through a plurality of signal transmission processes; and canceling residual interference signals among interference signals between the node pair and another node pair, wherein a portion of interference signals between the node pairs is cancelled by the relay node, by generating an effective interference channel matrix corresponding to the portion of the interference signals, based on interference channel matrices between the source nodes and the destination nodes, generating a reference matrix indicating a null space of the effective interference channel matrix, by controlling the channel coefficients, and using the effective interference channel matrix and the reference matrix to cancel the portion of the interference signals;

wherein channel coefficient of the relay node is varied according to the plurality of signal transmission processes, wherein a portion of the interference signals are canceled by the relay node, based on the varied channel coefficient of the relay node.

\* \* \* \* \*